Dec. 30, 1969  E. O. VILEN  3,486,294
AUTOMATIC WRAPPING MACHINE
Filed April 24, 1967  11 Sheets-Sheet 1

INVENTOR:
ERIK O. VILEN
BY
Marzall, Johnston, Cook & Root
ATT'YS

Dec. 30, 1969  E. O. VILEN  3,486,294
AUTOMATIC WRAPPING MACHINE
Filed April 24, 1967  11 Sheets-Sheet 2

INVENTOR:
ERIK O. VILEN
BY
Marzall, Johnston, Cook & Root
ATT'YS

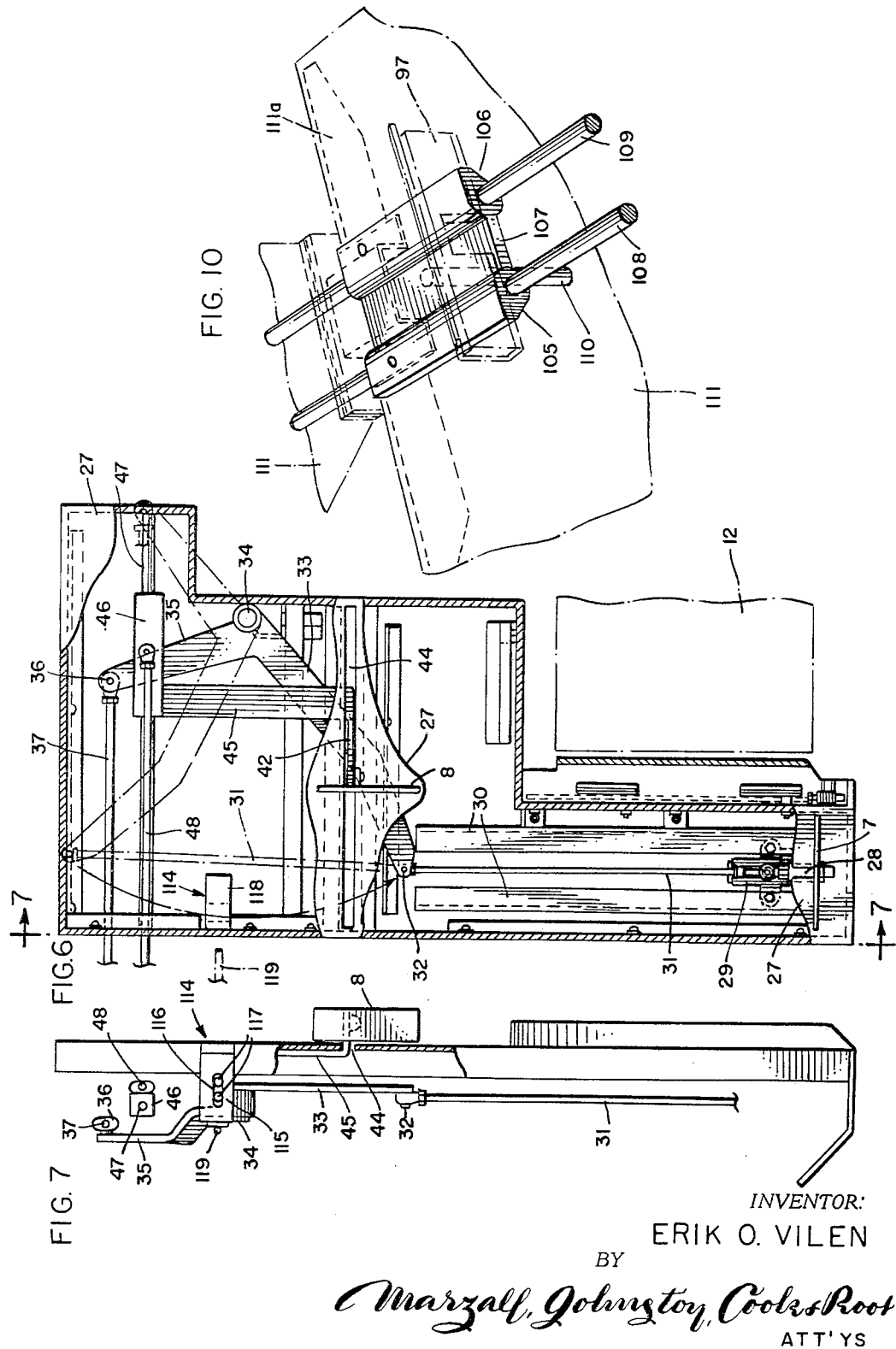

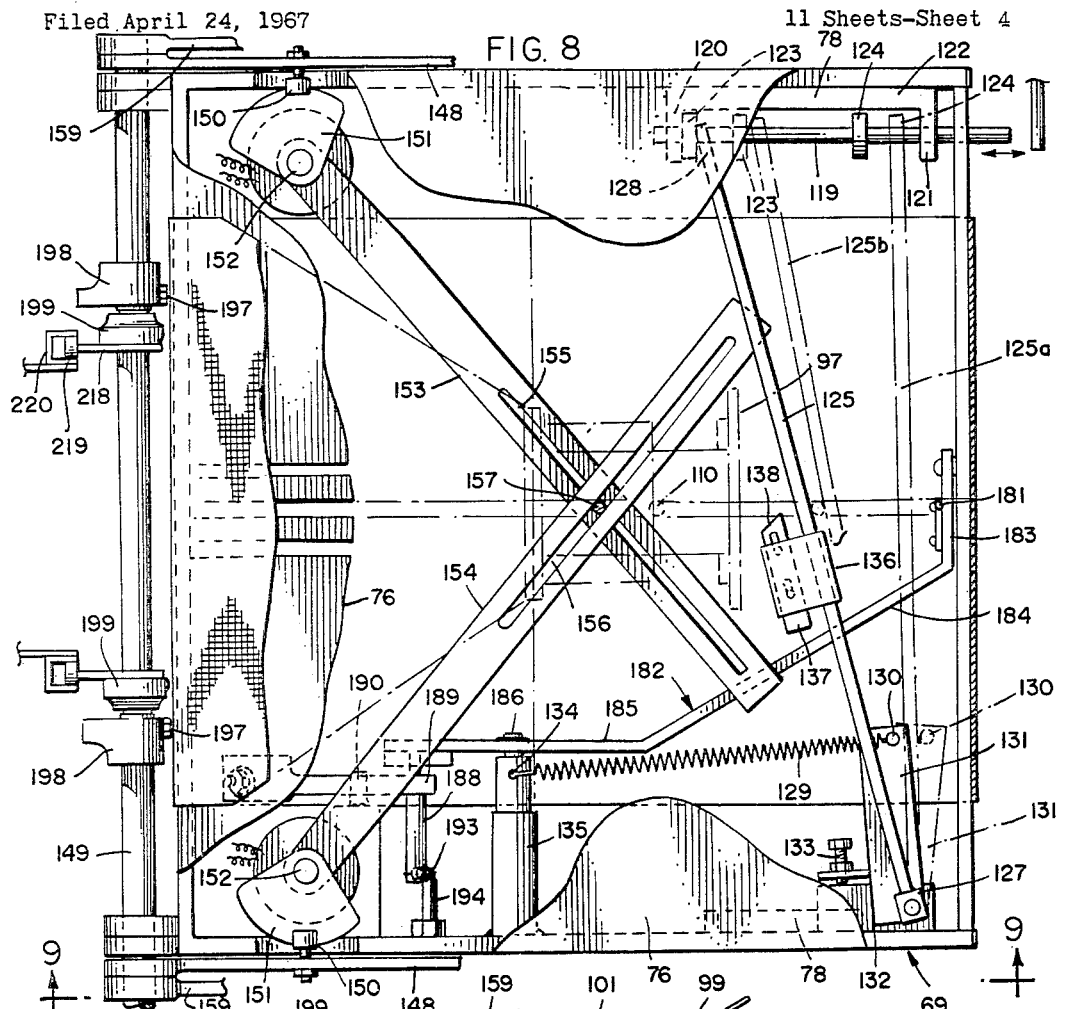
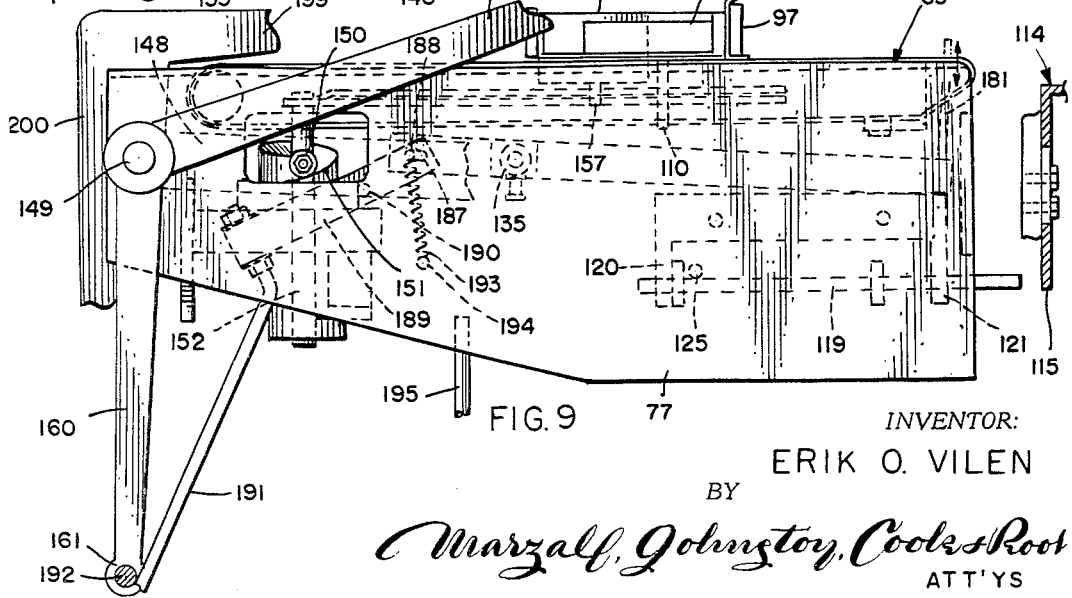

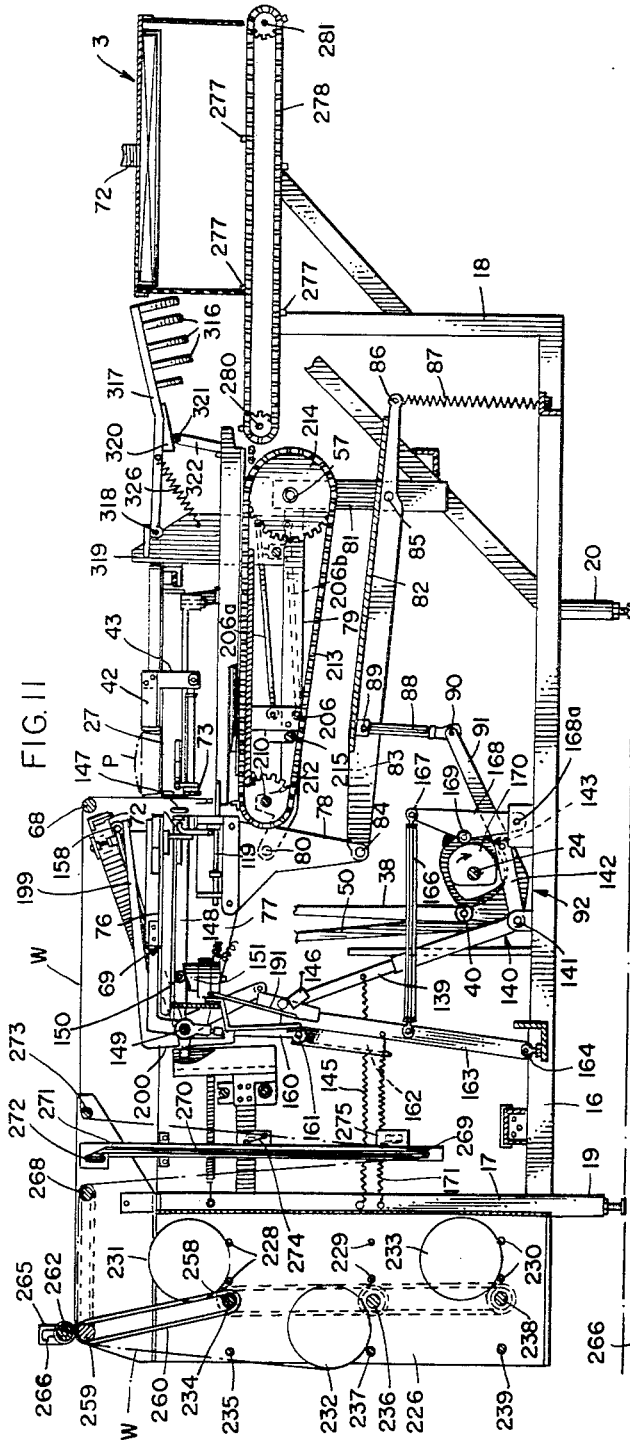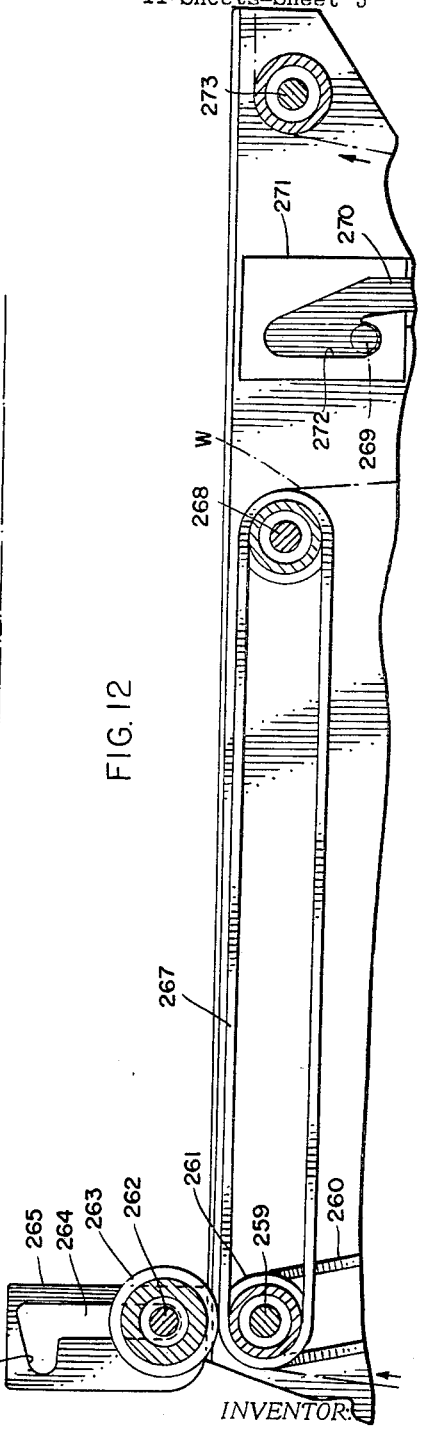

Dec. 30, 1969     E. O. VILEN     3,486,294

AUTOMATIC WRAPPING MACHINE

Filed April 24, 1967     11 Sheets-Sheet 6

INVENTOR:
ERIK O. VILEN
BY
Marzall, Johnston, Cook & Root
ATT'YS

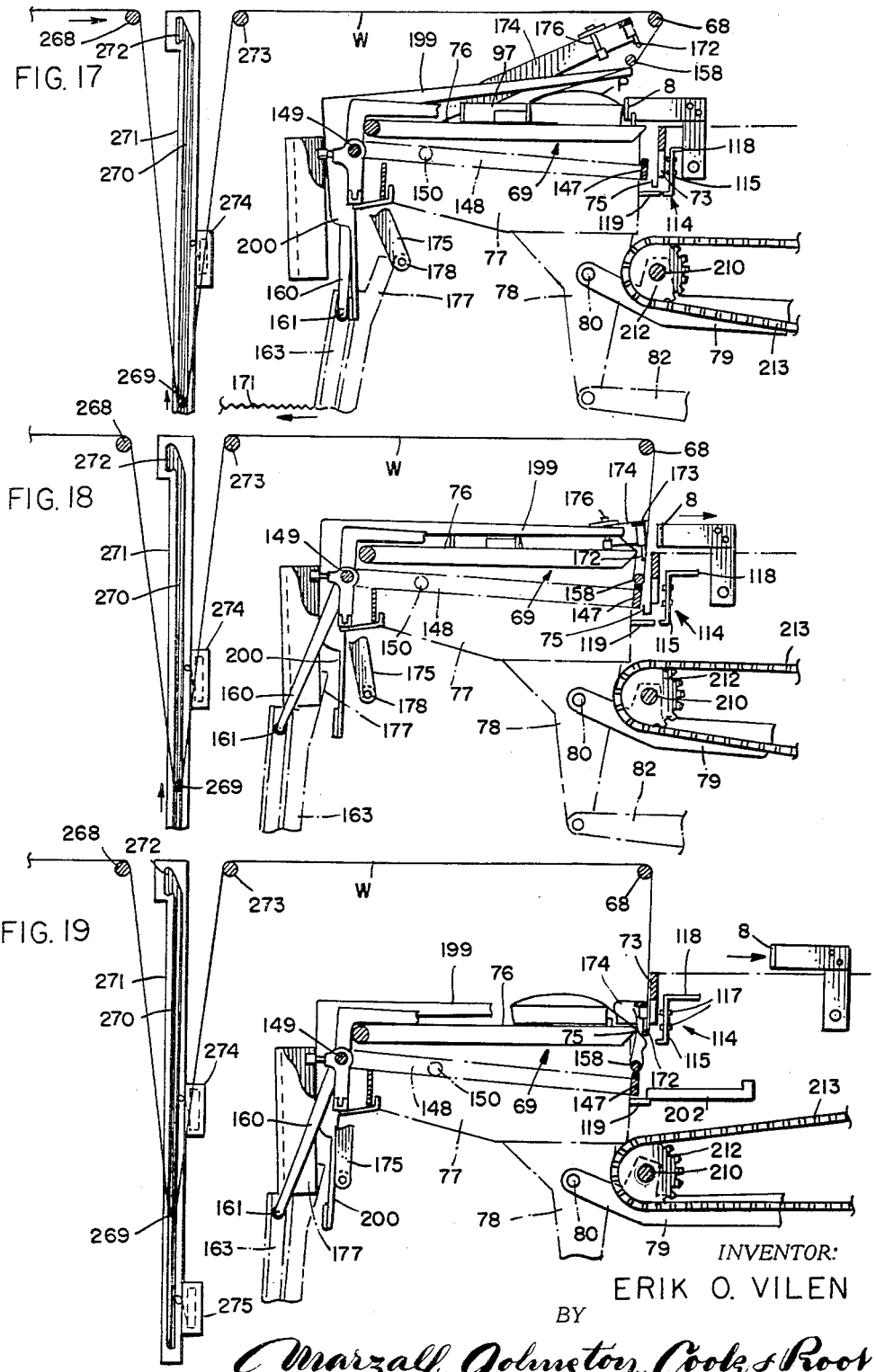

Dec. 30, 1969    E. O. VILEN    3,486,294
AUTOMATIC WRAPPING MACHINE
Filed April 24, 1967    11 Sheets-Sheet 8
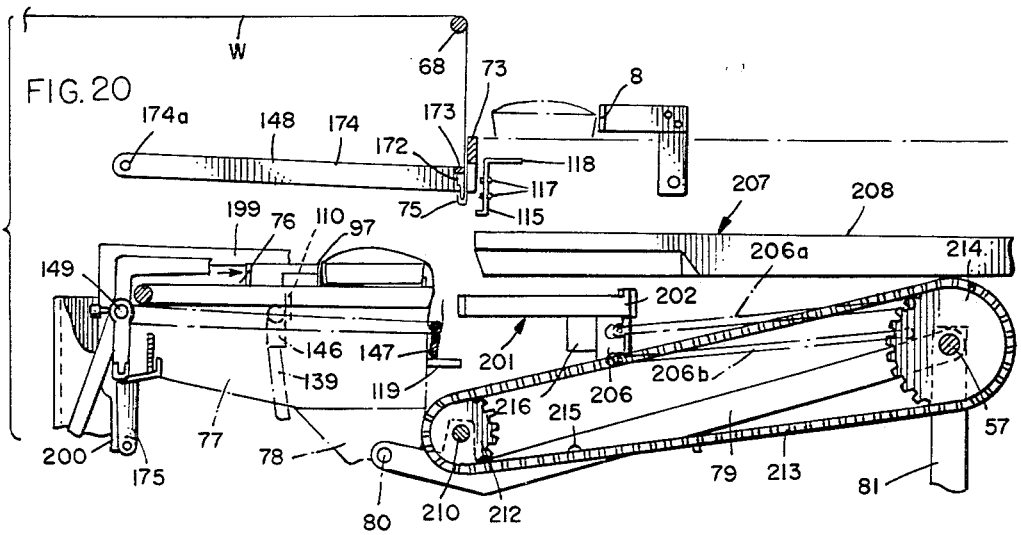
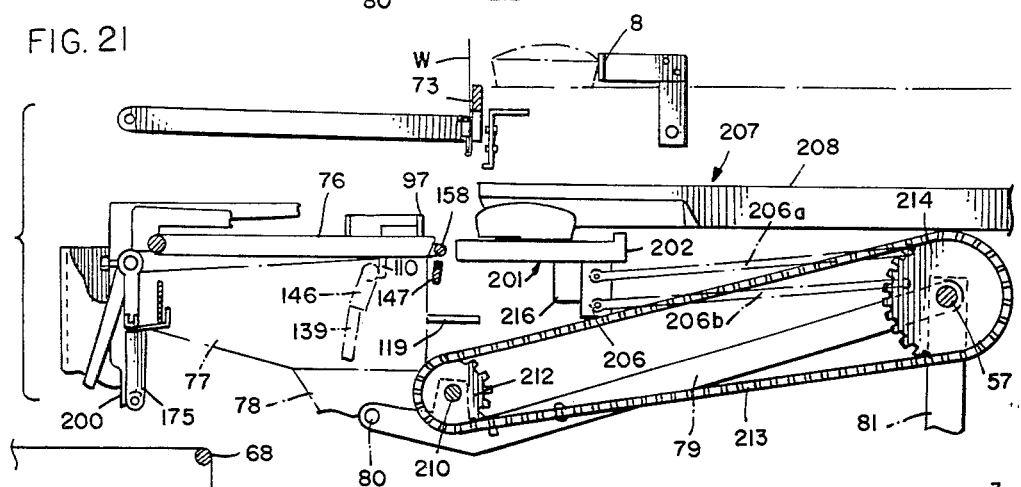
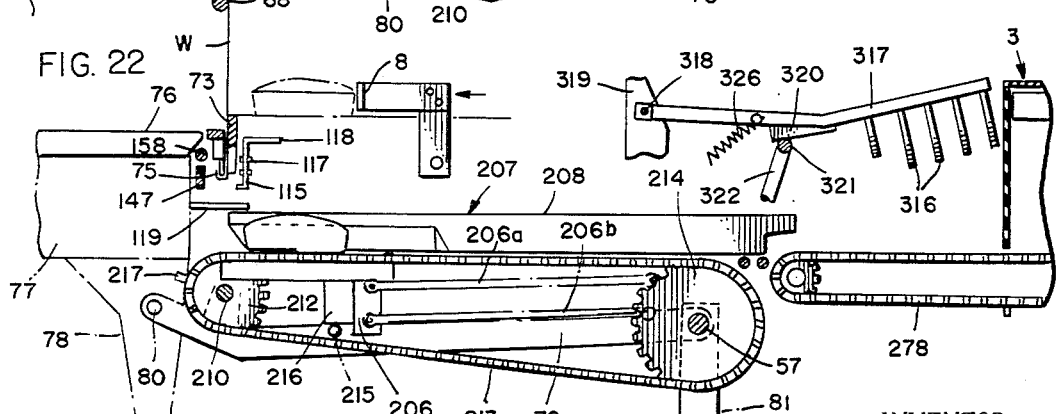
INVENTOR:
ERIK O. VILEN
BY
Marzall, Johnston, Cook & Root
ATT'YS

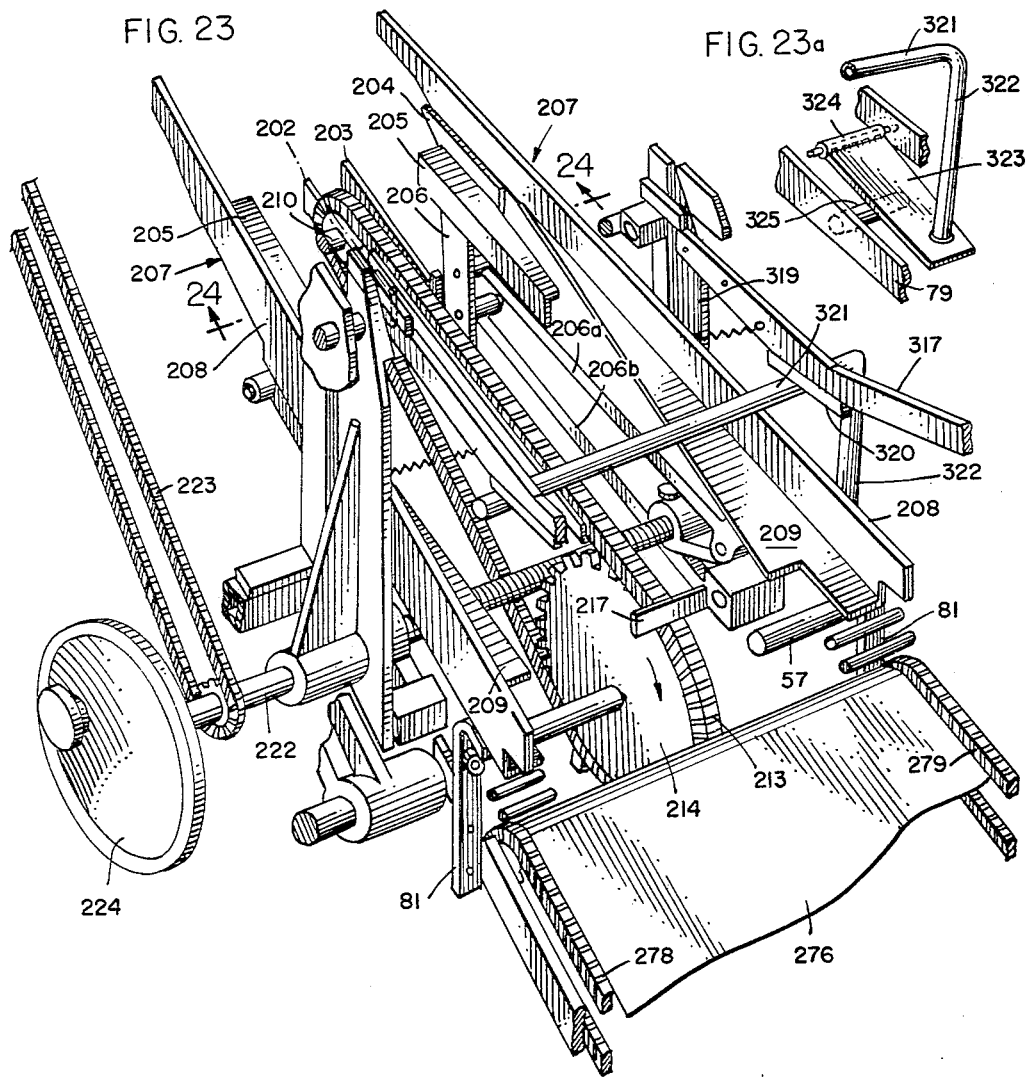

Dec. 30, 1969 E. O. VILEN 3,486,294
AUTOMATIC WRAPPING MACHINE
Filed April 24, 1967 11 Sheets-Sheet 10
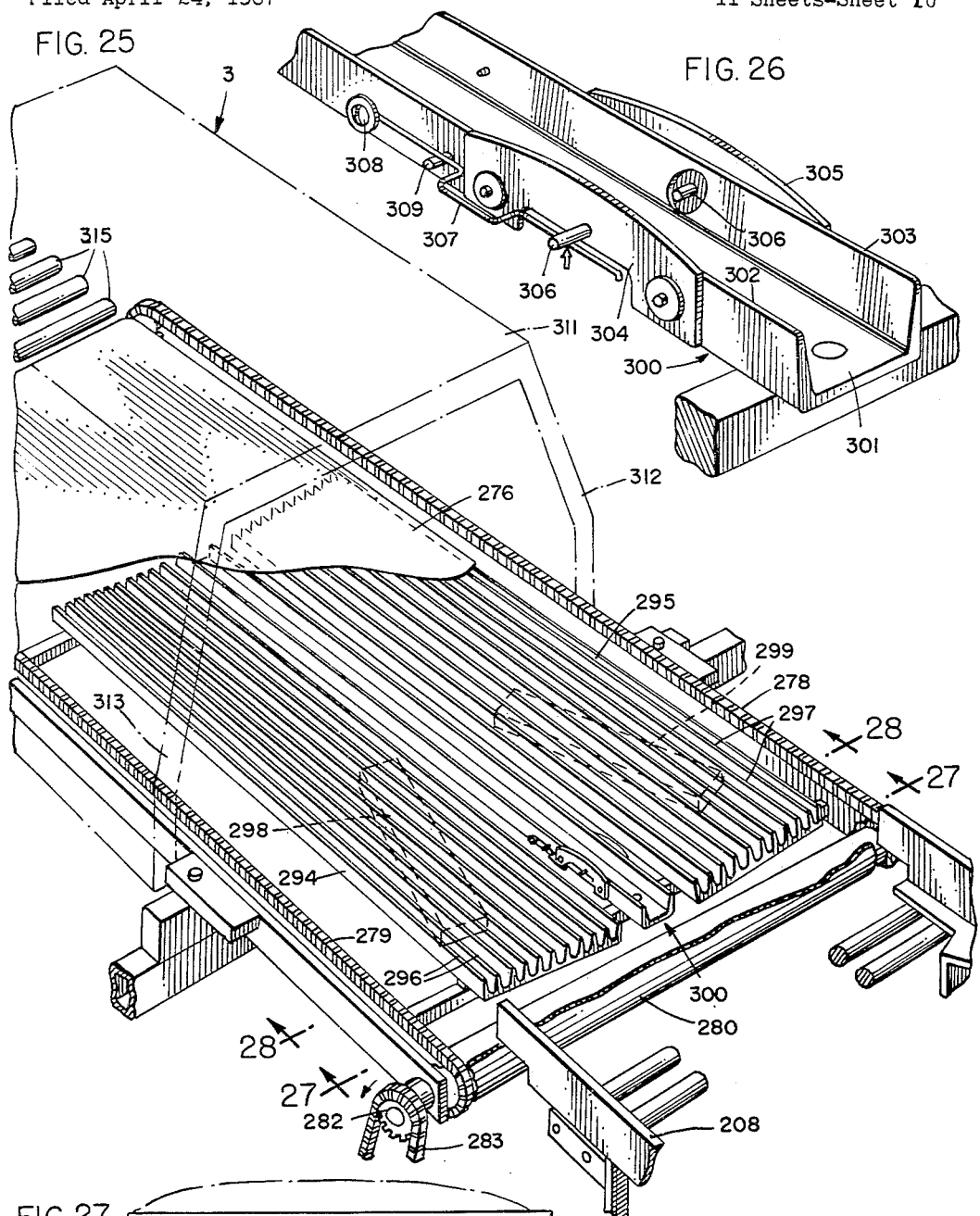
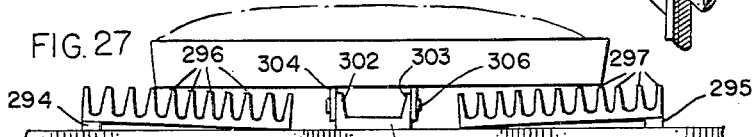
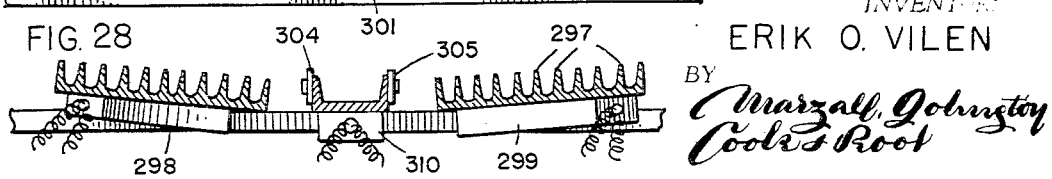
INVENTOR
ERIK O. VILEN
BY
Marzall, Johnston
Cook & Root

INVENTOR:
ERIK O. VILEN

United States Patent Office 3,486,294
Patented Dec. 30, 1969

3,486,294
AUTOMATIC WRAPPING MACHINE
Erik O. Vilen, Niles, Ill., assignor to Triangle Package Machinery Company, Chicago, Ill., a corporation of Illinois
Filed Apr. 24, 1967, Ser. No. 632,959
Int. Cl. B65b 11/22, 57/12, 59/02
U.S. Cl. 53—66                      20 Claims

ABSTRACT OF THE DISCLOSURE

A package to be wrapped is conveyed on one level to a wrapping station where it is pushed through a web of wrapping material onto a lowering table. A folder bar folds the material down behind the package and table and presses it against a gripper bar. The table, package, folder bar, and gripper bar, with the material therebetween, all move downwardly to a lower level. The web is cut at a level below the table as it moves down. At the lower level the package is moved in the opposite direction onto an outfeed conveyor back to the operator after the wrap has been completed and sealed.

BRIEF SUMMARY OF THE INVENTION

The invention is directed to an automatic wrapping machine for wrapping packages and is completely automatic as distinguished from the semi-automatic wrapping machines wherein an initial wrap is performed by hand before placement in the machine.

In the present machine a package is conveyed by an infeed conveyor and a cross-feed conveyor to a wrapping station consisting of a platform and an infeed pusher member. The infeed pusher pushes the package through a vertically hanging web of wrapping material onto a table, whereupon the leading end of the wrapping material is positioned below the package and extends upwardly around the advancing edge of the package. The web of material is furnished from a roll located at one end of the machine and which initially positions the web from above the platform and table to a position therebelow, and the leading end thereof is held against movement until the package is pushed therethrough onto the table.

Thereafter, a folder bar normally positioned above the table is caused to move downwardly carrying with it the web of wrapping material until the folder bar reaches a gripper bar positioned below the table. A bight of the wrapping material, then, is gripped between the folder bar and gripper bar.

The table, with the package thereon, together with the film gripped between the folder bar and gripper bar, all move downwardly. A cutting edge is fixed between the table and platform and during the downward movement of the table a wedge or blade member wedges the web of material over the cutting edge and behind it, so that a bight of the material is formed over the cutting edge. Continued movement downwardly of the table, package, folder bar and gripper bar with the material therebetween, causes the material to be cut by pulling it across the cutting edge.

When the lowering table reaches its lowermost position, the package is moved by an outfeed pusher from the lowering table onto a receiving table which thereupon causes a tucking of the wrapping material and causes the trailing end of the wrapping material to be folded along the bottom of the package in overlapping relation with that portion of the leading end thereof which had theretofore been brought against the package bottom. A slight movement upwardly of a pair of spaced downfolder supports lifts the package above the receiving table which will cause the outwardly extending ends of the wrapping material to be partially folded downwardly, whereupon a continuously moving conveyor moves the package through and beyond stationary plows to fold the remaining ends of the wrapping material upwardly against the bottom of the package. The package is then conveyed to a heating element to seal the ends of the wrap against the bottom of the package. In the event the wrapping material used is heat shrinkable, then the package will further be conveyed through a heat tunnel to shrink the material about the package.

There are numerous novel features involved in the present invention which have advantages over automatic wrapping machines heretofore known. In the past, the package to be wrapped has been either delivered from the wrapping station at a higher level or at the same level as the initial level of the package. In the present machine, the package is moved downwardly during the wrapping operation and thus enables a novel arrangement where the wrapped package may be returned to the machine operator. The operator merely places the package to be wrapped on the infeed conveyor which is initially positioned at a convenient height for the operator. The package, after being wrapped, is returned to the same place but a slightly lower level, whereupon the operator need only scoop a plurality of wrapped packages onto a third conveyor having a still lower level, if desired, for removal from the machine and placement in a store area to be sold.

A feature of the invention is an automatic control for determining the proper length of wrapping material for any given package regardless of its length or height. Other features include a novel feeding arrangement for the web of wrapping material, a novel storage arrangement for the wrapping material, a novel heat sealing device, and other novel and advantageous features, all of which will be described in greater detail hereinafter. In view of the foregoing, therefore, it is a principal object of the present invention to provide a fully automatic wrapping machine which is so arranged as to be more efficient than those heretofore known in that the wrapped package is returned to the same machine operator who originally placed the package to be wrapped onto the infeed conveyor.

Another object of the invention is to provide an automatic wrapping machine wherein the infeed conveyor on which the operator places a package to be wrapped is located at a level convenient for him and wherein the outfeed conveyor, which returns the wrapped package to the same operator at the same place, is at a slightly lower level, thereby enabling a substantially horizontal infeed and outfed of the package in a relatively small area.

A further object is to provide in an automatic wrapping machine a control whereby the length and height of a package will automatically determine the length of wrapping material necessary to completely and properly wrap the package.

A still further object of the invention is to provide in an automatic wrapping machine a lowering table onto which the package is moved through a vertically hanging web of wrapping material, which table is moved to a lower level for completion of the wrapping of the package, whereby the package is covered at all times as it passes through the machine.

Yet another object is to provide a novel arrangement of supports for the wrapping material in a wrapping machine whereby a plurality of rolls of different sizes may be stored for easy access by the machine operator to change from one size to another without the necessity of lifting any of the rolls from the machine.

Still another object of the invention is to provide a novel arrangement of wrapping material rolls to facilitate threading of the web of material through the various rollers to the wrapping station.

Another object is to provide in a fully automatic wrapping machine an arrangement for automatically maintaining a length of web from a roll of wrapping material to the wrapping station between a predetermined minimum and maximum.

A further object of the invention is to provide in a package wrapping machine a novel heat sealing device for sealing the underfolded ends of a heat sealable wrapping material against the bottom of the package.

Other objects and advantages of the invention will become apparent upon reading the following description taken in conjunction with the accompanying drawings, in which FIG. 1 is a schematic, side elevational view of a wrapping machine embodying certain novel features of the present invention;

FIG. 6 is a fragmentary, enlarged plan view taken along the plane of lines 6—6 of FIG. 3 with certain parts broken away and shown in section, and illustrating the actuating mechanism for the cross-feed and infeed pushers.

FIG. 7 is a fragmentary, elevational view partly in section, taken along the plane of line 7—7 of FIG. 6;

FIG. 8 is an enlarged top plan view of the lowering table with parts broken away to show some of the operating mechanism which forms a part of the automatic control for varying the length of wrapping material web for different size packages;

FIG. 9 is a side elevational view of the lowering table looking in the direction of the arrows along the plane of line 9—9 of FIG. 8;

FIG. 10 is an enlarged fragmentary, perspective view of a detail of the lowering table;

FIG. 11 is a vertical, longitudinal sectional view through the machine, taken substantially along the plane of line 11—11 of FIG. 4;

FIG. 12 is an enlarged fragmentary, vertical sectional view at one end of the machine taken along the plane of line 12—12 of FIG. 4 showing a part of the drive mechanism for feeding a web of wrapping material to the wrapping station;

FIG. 17 is an enlarged fragmentary and somewhat schematic view, shown in side elevation, of the position of certain parts of the machine at the time the package is pushed onto the lowering table from the platform;

FIG. 18 is a view similar to FIG. 17 but showing the infeed pusher being partially retracted and the folder bar down against the gripper bar with the bight of the web of wrapping material gripped therebetween;

FIG. 19 is a view similar to FIG. 18 but showing the wrapping material being cut after the lowering table, folder bar and gripper bar have begun their downward movement;

FIG. 20 is a view similar to FIG. 19 but showing the lowering table, package, folder bar and gripper bar in the lowermost position thereof and the receiving table in position for receiving the wrapped package;

FIG. 21 is a view similar to FIG. 20 but showing the wrapped package on the receiving table where it has been pushed by the outfeed pusher;

FIG. 22 is a view similar to FIG. 21 but showing the package resting on the downfolder supports above the receiving table while the supports and lowering table are still moving upwardly and just before the package is ready to be conveyed along the plows to the heat sealing device;

FIG. 23 is a fragmentary, perspective view of a part of the machine showing the outfeed conveyor and plows, as well as the conveyor which carries the package over the heat sealing device, and looking in the direction of the arrow shown at 23 in FIG. 3;

FIG. 23a is a fragmentary, perspective view of a detail to illustrate it more clearly than may be seen in FIG. 23;

FIG. 24 is a fragmentary, transverse sectional view taken substantially along the plane of line 24—24 of FIG. 23;

FIG. 25 is a fragmentary, perspective view of the heat sealing station with certain parts broken away for the sake of clarity, and taken along the plane and looking in the direction of the arrow at 25 in FIG. 3;

FIG. 26 is an enlarged perspective view of a detail of the heat sealing device shown in FIG. 25;

FIG. 27 is an end elevational view of the heat sealing device taken along the plane of line 27—27 of FIG. 25;

FIG. 28 is a transverse sectional view of the heat sealing device taken along the plane of line 28—28 of FIG. 25.

DETAILED DESCRIPTION

Figure 1:
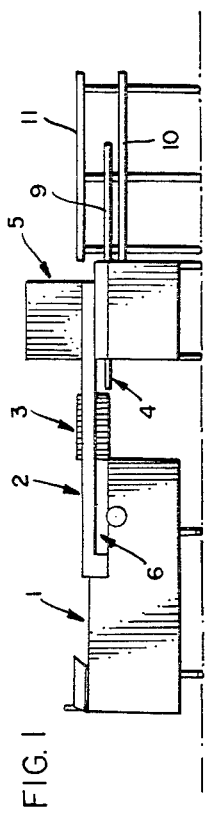
Figure 2:
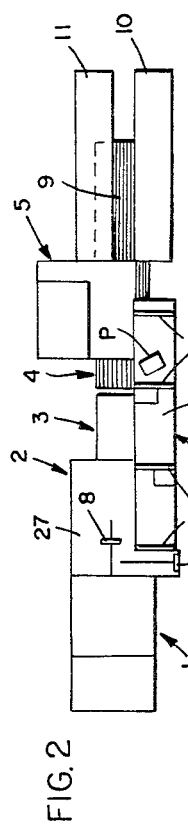
FIG. 2 is a plan view of the machine shown in FIG. 1.

Referring now more particularly to the drawings, and especially to FIGS. 1 and 2, there is shown somewhat diagrammatically a wrapping machine which embodies the features of the present invention as it is intended to be associated with other devices so that a package may be wrapped, weighed, and labeled automatically. The wrapping machine is indicated generally by the numeral 1 while the numeral 2 illustrates in general the location of the sealing station which heat seals the wrapping material on the bottom of the package. In the event the wrapping material being used is heat shrinkable, there is provided a heat tunnel generally indicated at 3 through which the package passes and which has the interior thereof heated to an appropriate temperature for shrinking the wrapping material about the package.

The numeral 4 indicates generally the scale or weighing station onto which the package is moved by suitable conveyor means from the heat tunnel. The weighing scale will register the weight of the package and will cause a label to be printed bearing the package weight thereon. The printed label is then delivered to the labeler generally indicated at 5, which then applies the label to the appropriate package theretofore weighed.

The combination of a wrapping machine with a weighing scale and labeler has been known and used heretofore. However, in addition to the features of the invention which relate specifically to the wrapping and sealing devices, the invention also contemplates an improvement whereby the machine operator may place a package to be wrapped on a conveyor and the wrapped, weighed and labeled package will be returned to the same operator at a different level.

This feature of the invention is illustrated in FIGS. 1 and 2 wherein the numeral 6 represents generally the infeed conveyor. FIG. 2 illustrates a package P being conveyed along the infeed conveyor 6 to a cross-feed pusher 7. This delivers the package to the wrapping station and positions it in front of the infeed pusher 8. As will be explained more fully hereinafter, the infeed pusher 8 will push the package through a web of wrapping material onto a lowering table which will transport the package to a lower level during which time the wrapping material is measured and cut so that it is then draped over the top of the package and hangs downwardly therefrom.

The lowering table has an outfeed pusher thereon which pushes the partially wrapped package onto a receiving table and the package is then moved by an outfeed conveyor through suitable downfolders and plows to complete the wrap. As the package moves through the heat sealer, heat tunnel, and across the weighing scale and labeler, it is fed outwardly of the machine assembly onto a shelf indicated at 9 in FIGS. 1 and 2. It is noted that the shelf 9 is at a slightly lower level than the infeed conveyor 6 but is still at a height convenient to the operator. A shelf or conveyor 10 is then provided at a still lower level from the shelf 9 so that the operator may remove several packages at a time and place them on the shelf 10 without lifting them, and from which they may be carried away from the machine and either placed in storage or on display in a store for sales purposes.

A shelf or conveyor 11 is also provided onto which the original packages to be wrapped may be placed. The machine operator will remove packages to be wrapped from the shelf 11 and place them on the infeed conveyor 6. The wrapped packages are returned to the operator on the shelf 9 and he then moves them onto the shelf or conveyor 10. Thus, the entire operation may be handled by a single person and the infeed conveyor 6, as well as the shelf 9, may easily be located at a height which is convenient for the operator.

Another feature of the invention which may be understood by viewing FIG. 2 is the automatic "squaring up" of the package. To achieve this result, the infeed conveyor 6 consists of a substantially horizontal stationary surface 12 along which a plurality of spaced pusher bars 13 may move. As may be seen more clearly in FIG. 29, the ends of the pusher bars 13 are mounted on endless chains 14 and are driven continuously from the main drive shaft.

A package P may be placed on the stationary surface 12 in a haphazard manner in substantially any position. As the next succeeding pusher bar 13 moves toward the cross-feed pusher 7, it will come in contact with the package and cause it to square itself transversely of the conveyor.

It is immaterial where the package is located on the conveyor with respect to the sides thereof because it will always be delivered to a position in front of the cross-feed pusher 7. This has the advantage that the machine operator need not take the time to be careful to place the packages on the conveyor in just the right position. He may place them thereon haphazardly and they will always be delivered to a position in front of the cross-feed pusher. Since this pusher has a definite and predetermined length of travel, it will always deliver the package in front of the infeed pusher 8 regardless of where the pusher 7 may pick up the package.

General arrangement

The arrangement of the various elements of the machine with respect to each other, as well as the power source and the devices which impart motion to the elements of the machine, may be viewed generally by reference to FIGS. 3, 4, 11, and 29. The machine consists of a frame generally indicated by the numeral 15 which comprises the spaced bottom angle members 16 which extend longitudinally of the machine. Upright bracing end members 17 and 18 extend upwardly from the lower side members 16 and the frame is supported by the legs 19 and 20 at each side of the machine. The uprights 17 and 18 are connected by another longitudinally extending angle member 21 at the top thereof. Intermediate the two ends of the frame the lower and upper members 16 and 21 may be connected by intermediate bracing and support members 22 and 23.

A main drive shaft 24 extends transversely of the frame and is journaled in suitable bearings at the ends thereof. The drive shaft is driven by a motor 25 through suitable gear reduction means 26. As will become apparent hereinafter, the drive shaft 24 has several cams spaced along the length thereof, all of which are driven to impart certain mechanical movements to achieve the end results.

The infeed devices

As explained hereinabove, the infeed conveyor 6 positions a package P to be wrapped in front of the cross-feed pusher 7 which delivers it to a position in front of the infeed pusher 8.

Figure 4:
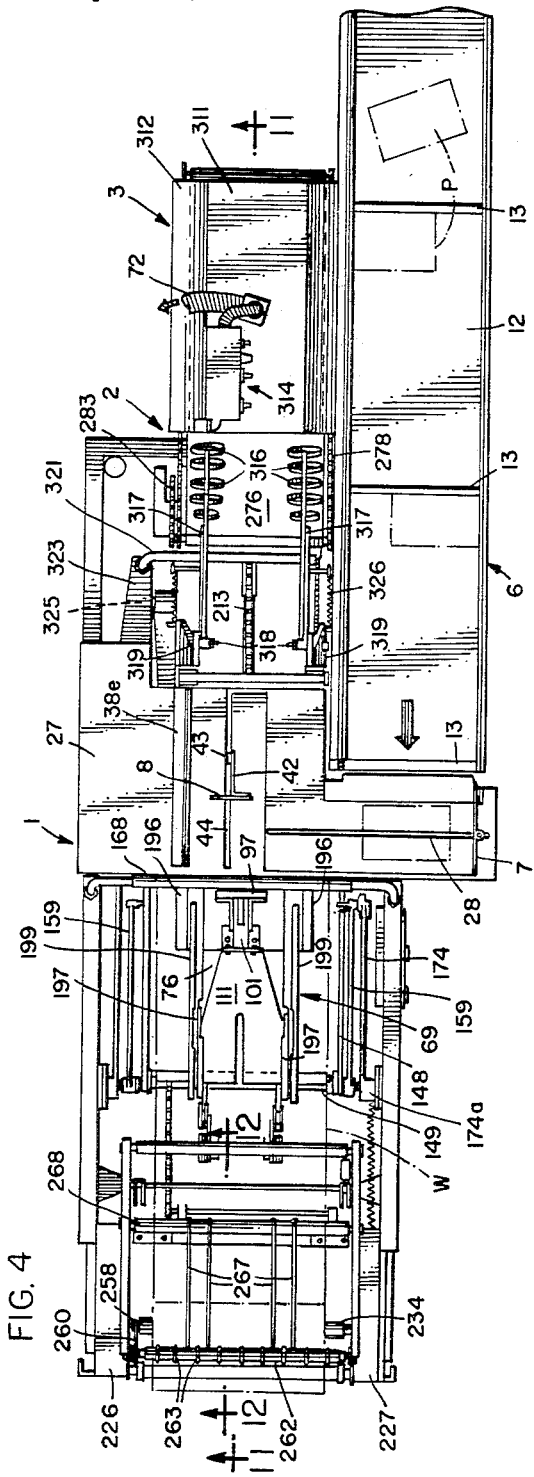
FIG. 4 is a plan view of the machine shown in FIG. 3.

The platform across which the package moves from the infeed conveyor is identified by the numeral 27 and may be seen particularly in FIGS. 4, 6 and 11. In FIG. 6 the platform 27 has been broken away in certain areas to illustrate more clearly the drive mechanisms located therebelow for imparting movement to the cross feed pusher 7 and the infeed pusher 8.

Reference to FIG. 6 will now be made for some of the operating parts although FIG. 4 also illustrates those elements which lie above the plane of the platform 27. This platform is provided with an elongated slot 28 which extends transversely of the machine frame so that the pusher member 7 above the platform may be suitably secured to a reciprocating carriage 29 located below the platform 27. This carriage 29 is adapted to slide along the length of the guide tracks 30. A rod 31 is connected at one end thereof to the carriage 29 and is connected at its other end, as at 32, to one arm 33 of a bell crank lever. This bell crank is pivotally secured to the frame at 34 and has its other arm 35 connected at the end thereof, as at 36, to an elongated longitudinally extending rod 37.

It will be evident that a rotative movement of the bell crank in a clockwise direction, as viewed in FIG. 6, to the dot-dash line position thereof, will cause a movement of the connecting rod 31, carriage 29, and cross-feed pusher 7, in a direction transversely of the machine. Rotation of the bell crank in the opposite direction, counter-clockwise, back to its original full line position of FIG. 6, will return the pusher 7 back to its original position, as shown in FIGS. 4 and 6, where it is ready to pick up another package placed in its path of movement by the infeed conveyor 6.

Figure 29:
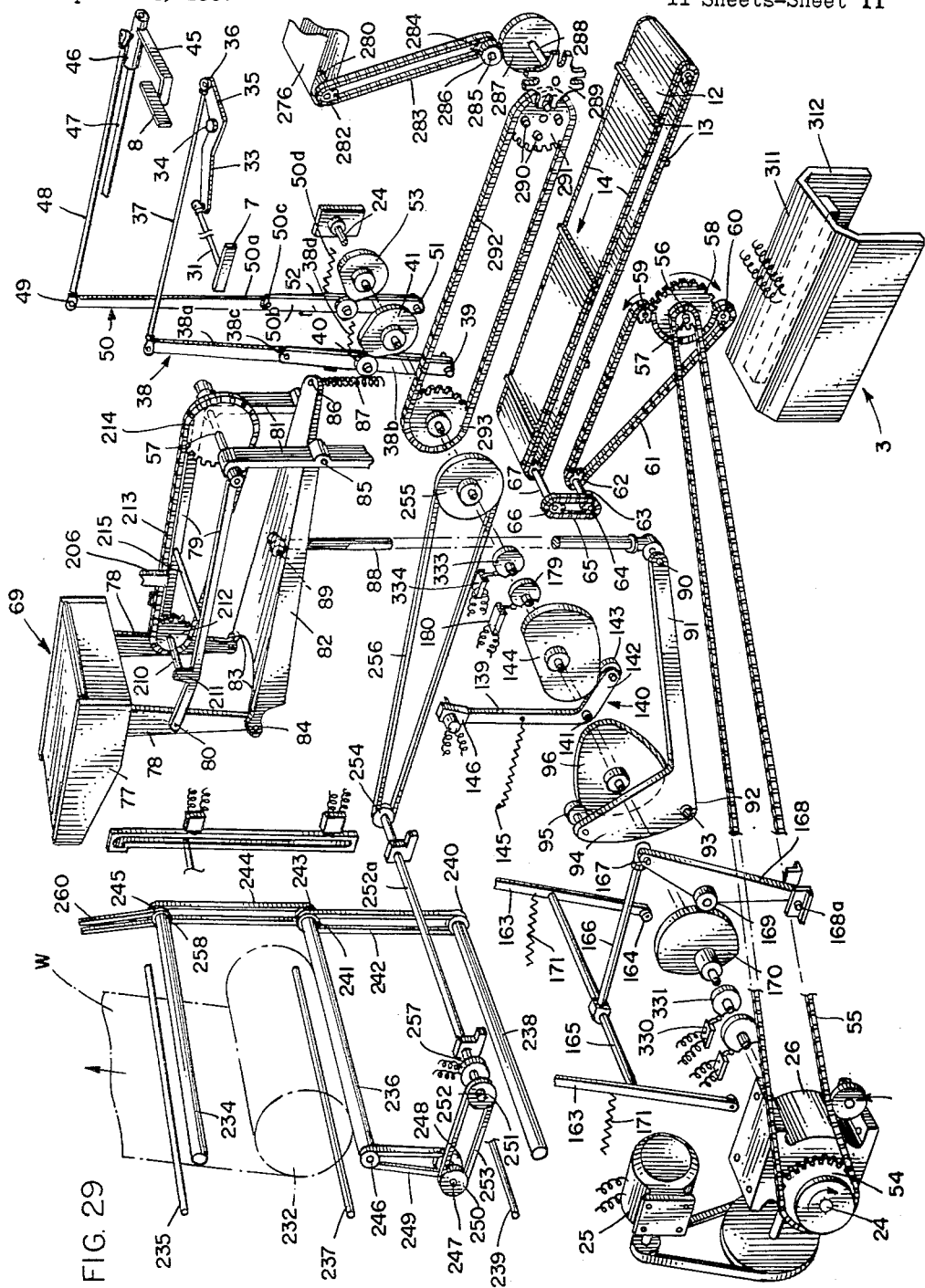
FIG. 29 is an exploded, perspective view of the main drive shaft with the operating cams thereon and some of the operating parts of the machine.

The reciprocating rotary movement of the bell crank is caused by a longitudinal reciprocation of the connecting rod 37 which is secured at its opposite end to an upright rocker arm 38. This arm may be seen in FIGS. 11 and 29 and consists of two parts 38a and 38b pivotally connected together at 38c. Referring especially to FIG. 29, it will be noted that the lower end of the part 38b of the rocker arm 38 is pivotally mounted on the frame at 39. Intermediate the ends thereof there is provided a cam follower 40 which is urged into contact with the edge of cam 41 mounted on the drive shaft 24 by means such spring 38d. It will be evident that as the cam 41 rotates, it will cause a rocking movement of the arm 38 about its bottom pivot 39 to reciprocate the rod 37, thereby imparting a rotary reciprocating movement to the bell crank lever consisting of the arms 33 and 35, and a reciprocating motion of the cross-feed pusher 7.

As may be seen in FIG. 4, there is a stop member 38e on the platform 27 against which a package will abut when being pushed by pusher 7. When packages of greater width are wrapped, the pusher 7 will stop short of its normal travel, but cam 41 (FIG. 29) will continue to urge arm 38 against tension of spring 38d to allow part 38b to move and 38a to stop and position the package in front of pusher 8. This infeed pusher 8 has a rearwardly extending portion 42 connected thereto and a downwardly extending part 43 (FIGS. 11 and 17–22) which passes through a slot 44 in the platform 27 which extends longitudinally of the machine.

The downward extension 43 of the infeed pusher is provided with a cross member 45 (FIGS. 6 and 29) extending transversely of the frame, and which at its other end is connected to a sleeve 46. This sleeve receives a guide rod 47 which extends longitudinally of the frame and along which the sleeve and infeed pusher member are adapted to slide. When this sleeve 46 is caused to move toward the left, as viewed in the various figures of the drawings, it will cause the infeed pusher 8 also to move toward the left, thereby to feed a package from the platform through a web of wrapping material and onto a lowering table, as will become apparent hereinafter.

FIGS. 6 and 29 show a rod 48 connected at one end to the sleeve 46 and at its other end it is connected at 49 to the upper end of a second rocker arm generally indicated at 50 and consisting of two parts 50a and 50b, which also extends upwardly from the lower part of the frame and is pivotally mounted at 51 for rocking movement about its lower end. The two parts are pivotailly connected at 50c. Intermediate the ends of part 50b of arm 50, a cam follower 52 is mounted and is urged by spring 50d into contact with the edge of a cam 53 also mounted on the drive shaft 24. Rotation of the cam 53 through one revolution will cause the arm 50 to rock back and forth pulling the sleeve 46 in a reciprocating movement along the guide rod 47, thereby reciprocating the infeed pusher 8 across the platform 27 for feeding a package which has been delivered to a position in front of the pusher.

Figure 3:
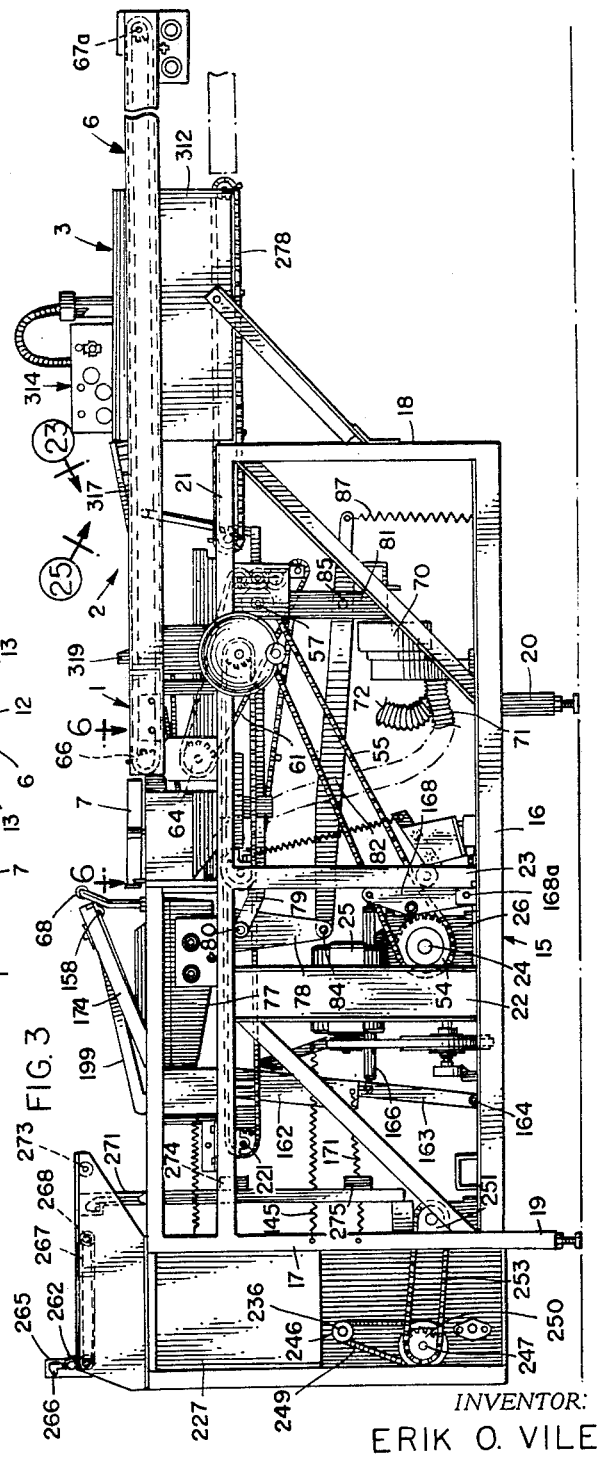
FIG. 3 is a somewhat enlarged side elevational view of a wrapping machine embodying the present invention, but showing the machine in greater detail.

The mechanism for driving the chains 14, to which the transverse pusher members 13 are connected, may best be understood by reference to FIGS. 3 and 29. One end of the drive shaft 24 has mounted thereon a sprocket 54 to which an endless chain 55 is engaged. A second and preferably smaller sprocket wheel 56 mounted on a shaft 57 has the chain 55 trained therearound so that a clockwise movement of the drive shaft and sprocket 54, as viewed in FIGS. 3 and 29, will impart a clockwise movement to the shaft 57.

A second and larger sprocket wheel 58 is also mounted on shaft 57 which has the two smaller sprockets 59 and 60 associated therewith, one thereabove and one therebelow. A chain 61 is trained around the two smaller sprockets 59 and 60 as well as a part of the sprocket 58. The chain also engages a sprocket wheel 62 mounted on the shaft 63. Thus, with this arrangement the clockwise rotation of shaft 57 and sprocket 58 will impart a counter-clockwise rotation of sprocket 62 and shaft 63. This latter shaft also has mounted thereon a sprocket 64 which engages a chain 65 also trained around a sprocket 66 on shaft 67. This latter shaft also will rotate in a counter-clockwise direction.

The spaced chains 14 are trained around suitable sprockets on shaft 67 at one end of the conveyor and around suitable sprockets on shaft 67a at the opposite end of the conveyor 6. This arrangement thereupon imparts a continuous movement of the upper reach of chain 14 in the direction of the arrow in FIG. 29, thereby carrying with it the cross members 13 to feed a package placed on the surface 12 to a position in front of the cross-feed member 7.

The lowering table

As mentioned hereinbefore, after the package P which is to be wrapped has been delivered to a position in front of the infeed pusher 8 on the platform 27, it is pushed through a web of wrapping material onto a lowering table. The details of the table and the parts connected thereto may be seen in FIGS. 8 and 9 but it may also be seen in a general way in FIGS. 4 and 11. FIGS. 17 through 22 show the lowering table more or less schematically as it is being lowered for the wrapping operation and then elevated back to the level of the platform 27.

The web of material W may be seen in FIG. 11 as extending from a roll of such material and over a roller 68 from which it hangs downwardly in a substantially vertical plane between the platform 27 and the lowering table, which is generally indicated by the numeral 69, and transversely thereof. One of the features of the invention is the manner in which a plurality of rolls of wrapping material are stored when not in use and may be moved to a useable position. This feature, however, will be described in greater detail hereinafter, it being sufficient for present purposes merely to note that the web of material is draped over the roller 68 and hangs downwardly therefrom.

The lower or leading end of the wrapping material W is held against movement by suitable means until the package P moves through the web and carries it onto the lowering table at which time the leading end is caused to be released. In the particular embodiment of the invention as disclosed herein, such leading end of the wrapping material is held in place against a bar by means of a vacuum.

A blower 70 is mounted in the frame of the machine to which flexible tubes 71 and 72 are attached (FIG. 3). The blower is arranged to create a vacuum in the flexible tube 71 and to blow air through the tube 72. As will become apparent later in this description, the tube 72 leads to the heat tunnel where the air is heated for shrinking the wrapping material about the package in the event the material is of a heat shrinkable type.

The tube 71 is connected to a hollow bar 73 (FIGS. 11 and 16 through 22). One face of the bar 73 is provided with a plurality of holes 74 so that the vacuum in the hollow bar will draw the leading end of the web W against it and hold it in place until the force of the package P moving onto the lowering table will pull it free of the vacuum.

The cutting means is fixed to the bar 73 and extends transversely of the machine therebelow. The preferred form of such cutting means which cuts the web at the desired length consists of a knife edge 75 which is preferably serrated and spaced from the bar 73, thereby to provide a channel or space behind the knife 75 and to enable the web of wrapping material to be wedged over and behind the knife edge. As will appear hereinafter in greater detail, the web of wrapping material will become wedged behind the knife edge forming a bight of the material over the edge so that downward movement of the lowering table will tear the web across the knife edge to cut it to the proper length.

The lowering table 69 is provided with an upper surface 76, a part of which is shown broken away in FIG. 8, so that certain mechanism mounted on the table below the upper surface thereof may be seen.

The lowering table is provided at opposite sides thereof with an apron 77 to which the upper ends of the spaced downwardly extending legs 78 may be secured (FIGS. 3, 11 and 29).

The lowering table is caused to be raised and lowered by suitable mechanism operated from the drive shaft and is caused to remain in a substantially horizontal position by means of a parallelogram arrangement which may best be seen in FIGS. 11 and 29. A pair of spaced upper arms 79 are pivotally mounted at one end thereof, as at 80, to the legs 78. The opposite ends of the arms 79 are mounted to rotate about the fixed shaft 57. The shaft 57 is mounted on the spaced supports 81 secured to the frame of the machine.

The bottom of the parallelogram consists of an elongated shelf or plate member 82 formed at one end thereof into the spaced arms 83 pivotally mounted, as at 84, to the legs 78. This plate or shelf 82 extends between the supports 81 and is pivotally secured between the ends thereof to the supports 81 by means of the elongated pivot pin 85 extending therethrough. The end 86 of the shelf 82 has a tension spring 87 secured thereto and which is mounted on the frame normally urging the end of the shelf downwardly and the table upwardly, thereby acting as counterbalancing means which, as will presently be seen, results in lessening the pressure of a cam follower against the cam on the drive shaft which causes the lowering table to move up and down.

A substantially vertically extending link 88 is pivotally secured at its upper end to the shelf 82, as indicated at 89. The lower end of the link 88 is likewise pivotally secured as at 90, to the outer end of one arm 91 of a bell crank lever 92. This lever is mounted for rotation about a pivot pin 93. The other arm 94 of the bell crank 92 has a cam follower 95 mounted thereon which bears against the cam surface of the cam 96.

Thus far it will then be evident that as the cam 96 rotates with the drive shaft 24, it will impart a rocking motion to the bell crank 92, thereupon imparting a raising and lowering of the table 69 through the link connection 88.

The lowering table 69 is provided on the upper surface thereof with an outfeed pusher 97 against which the leading edge of the package P bears through the web of wrapping material as the package is moved onto the table by the infeed pusher 8. This outfeed pusher 97 may be seen in FIGS. 4 and 11 in the general assembly of the machine and may be seen in greater detail by reference to FIGS. 8, 9, 13, and 14.

Figure 13:
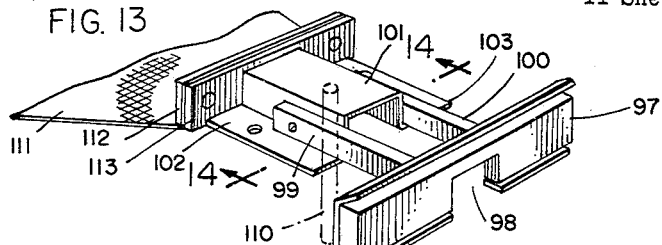
FIG. 13 is an enlarged fragmentary, perspective view of another detail of the outfeed pusher which moves along the surface of the lowering table.
Figure 14:
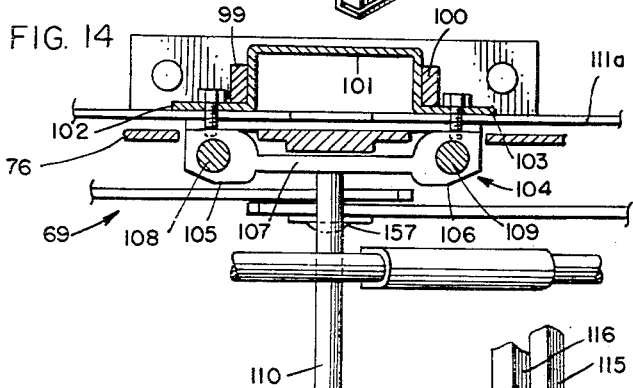
FIG. 14 is a transverse sectional view taken along the plane of line 14—14 of FIG. 13.

Referring now especially to FIG. 13, the front face of the outfeed pusher 97 is recessed, as shown at 98, for a purpose which will appear more fully hereinafter. A pair of spaced arms 99 and 100 extend rearwardly from the face of the pusher and embrace a mounting member 101 to which they are secured. This member 101 is channel-shaped and has outwardly extending flanges 102 and 103 through which the pusher is mounted on a sliding carriage generally indicated at 104 in FIGS. 10 and 14.

The carriage 104 is formed with a pair of laterally spaced sleeve members 105 and 106 connected by a cross member 107. Spaced guide rods 108 and 109 extend longitudinally of the lowering table and are received by openings in the spaced sleeve members 105 and 106 whereby the carriage 104, with the pusher 97 mounted thereon, may slide back and forth across the top of the lowering table 69.

An elongated pin 110 is fixed to and extends downwardly from the carriage 104 so that it may travel back and forth with the pusher.

A fabric belt 111 extends around the front and rear edges of the lowering table and across the top thereof. One end of the belt is relatively narrow and is secured to the outfeed pusher 97 by any suitable means, but in the form shown for example in FIG. 13, the end of the belt is clamped between the plates 112 and 113 which in turn are mounted on the pusher 97. From the rear of the pusher the fabric belt extends around the rear edge of the table and therebelow back to the front edge thereof and over the upper surface of the table, as may be seen for example by the dot-dash lines in FIGS. 8, 9 and 10. The other end of the belt passes around a retainer bar 111a and is secured to the pusher 97 by suitable bolts passing therethrough and through the flanges 102 and 103. As the pusher 97 recedes along the table under pressure of the package being pushed by the infeed pusher 8, the upper reach of the belt 111 will move rearwardly and the lower reach will move in the opposite direction. The belt is suitably slotted to receive the pin 110 to allow it to move with the outfeed pusher 97 in its reciprocating movement across the table top.

The foregoing describes the lowering table, the outfeed pusher mounted thereon, and the mechanism which causes the table to be raised and lowered. There are, however, a number of other elements which become operative during the wrapping of the package which are mounted on the table or which are otherwise associated therewith, each of which will be described separately to facilitate understanding thereof.

Automatic sensing device

An important feature of the wrapping machine and which forms a part of the present invention is the provision of suitable means to prevent the infeed pusher 8 from moving through the web W of wrapping material when no package is present to be moved onto the lowering table. If this were to occur, the leading end of the web would be pulled away from the vacuum retainer and would hang loosely between the platform 27 and table 69 and would have to either be put back in place by hand or possibly obtain an unsatisfactory wrap the next time a package is pushed onto the table. When the machine operates in the absence of a package to be wrapped, a sensing device will stop advancement of the infeed pusher 8 before it reaches the web of wrapping material. When a package is present, the sensing device is caused to move out of the path of movement of the infeed pusher and allow it to continue movement in order to feed the package onto the lowering table.

The sensing device is indicated generally by the numeral 114 and may be seen in FIGS. 6 to 9, 11 and 16. The device includes a vertically extending plate 115 provided with an elongated slot 116 therein. This plate is mounted on one side of the bar 73 or on a suitable part of the machine frame by means of a pair of bolts 117 which pass through the slot 116 and allow the plate to reciprocate up and down. A substantially horizontally disposed plate 118 is secured to the upper end of plate 115 and moves therewith in its up and down motion.

Mechanism is provided to elevate the plates 115 and 118 to an upper position so that the plate 118 will be in the direct path of movement of the cross member 45 (FIG. 6) which moves the pusher against the plate 118 when no package to be wrapped is present. When a package is present, the receding movement of the outfeed pusher 97 will allow the plate 118 to drop downwardly out of the path of movement of the cross member 45 connected to the infeed pusher 8.

This last mentioned mechanism includes a rod 119 mounted on the framework of the lowering table and is supported for a longitudinal sliding movement in supporting legs 120 and 121 of a bracket 122 (FIGS 8 and 9).

Bumper discs 123 and 124 are secured to the rod 119 in spaced relation thereon whereby pressure against bumper disc 123 in one direction will move the rod 119 rearwardly out of the path of the plate 115 to allow it to drop downwardly. Pressure against the other bumper disc 124 in the opposite direction will move the rod 119 outwardly into the path of the plate 115 of the sensing device.

Figure 15:
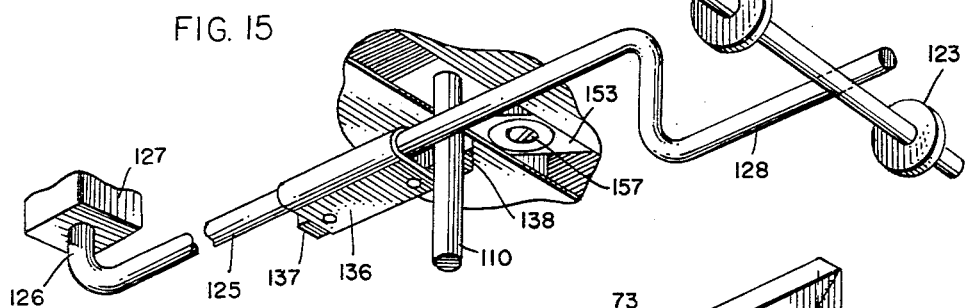
FIG. 15 is a fragmentary, perspective view of a detail of a part of the mechanism of the lowering table shown in FIG. 8.
Figure 16:
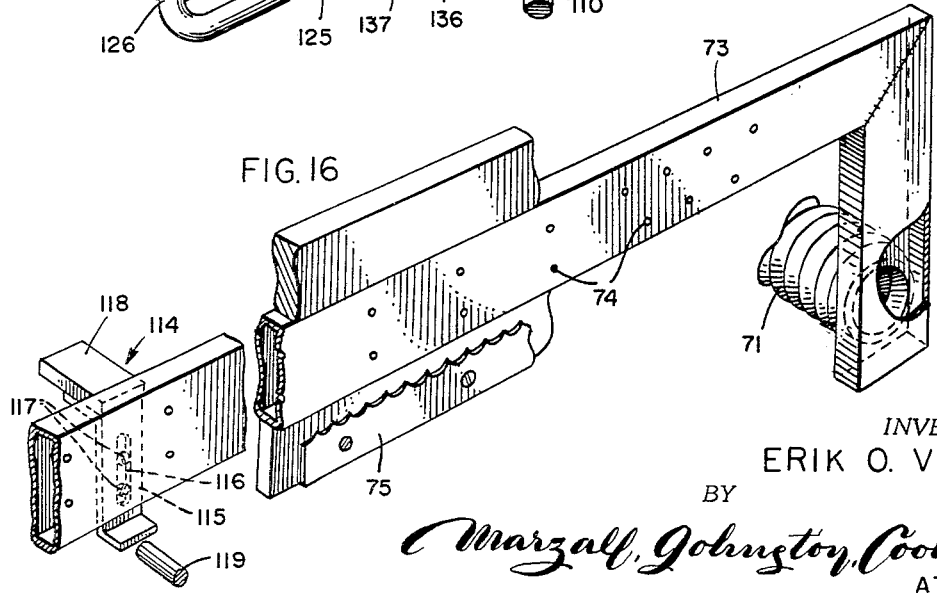
FIG. 16 is a fragmentary, detail perspective view of the vacuum holding device for holding the leading end of the web at the wrapping station.

This back and forth movement of the rod 119 is caused by the actuator 125. This actuator, as illustrated in FIGS. 8 and 15, consists of an elongated rod, one end 126 of which is bent at right angles and mounted in a supporting block 127 for pivotal movement. The opposite end 128 of the actuator 125 is bent so that it may ride on the rod 119 between the two bumper discs 123 and 124.

A tension spring 129 is mounted at one end thereof to a stud 130 located at one end of a rotating block member 131 pivotally mounted at its opposite end to rotate with respect to the actuator 125. Adjacent thereto is a fixed stop member 132 against which an adjustable stop 133, movable with the block 131, is adapted to abut to limit the rotative movement of the aforesaid block. The other end of spring 129 is secured, as at 134, to a fixed bearing member 135 extending inwardly from a side of the lowering table. As will presently be seen, the stud 130 extends into the path of movement of the actuator 125.

Intermediate the ends of the actuator 125 there is provided a bracket 136 which has slidably mounted between the sides thereof a finger 137, one end of which is provided with a cam surface 138. This finger is spaced from the actuator 125, as may be seen in FIGS. 8 and 15, a sufficient distance to enable the rod 110 to be received therebetween.

The position of the various parts shown in FIG. 8 shows the outfeed pusher 97 in a retracted position where it would be if there were a package on the table in the process of being wrapped. It is understood, of course, that the exact position of the pusher would depend upon the length of the package being wrapped. The longer the package, the greater will be the distance through which the pusher will be retracted as the package is moved onto the table. For purposes of illustration, however, FIG. 8 shows the pusher 97 retracted as though an average sized package were present on the table.

The actuator 125 in its full line position of FIG. 8 has contacted bumper disc 123 and moved it, together with rod 119, rearwardly so that the rod has been removed from the path of plate 115 of the sensing device 114. It will be noted also that in this position the spring 129 has pulled the block 131 so that the stop 133 will be abutting against the fixed stop member 132. In this position the stud 130 will be out of contact with the actuator 125.

The various parts will remain in this position during the time that the lowering table moves downwardly. When the table reaches its lowermost position, the outfeed pusher 97 will be caused to move forwardly from the position thereof in FIGS. 8 and 20 all the way to the forward edge of the table in order to deposit the package on a receiving table. During this movement the pin 110 moves forward until it contacts the actuator 125 so that continued movement of the pusher will carry the actuator with it. The actuator will first strike the stud 130 so that the position of the actuator 125, the rotating block 131, and the bumper disc 124 will all be in their dot-dash line position shown in FIG. 8 where the actuator's position is identified at 125a.

As soon as the package has been deposited on the receiving table, the actuating member for the outfeed pusher 97, as will presently be described, allows the spring 129 to exert its tension to pull the block 131 and actuator 125 back a relatively short distance to the point where the actuator 125 may lie idle against one side of the bumper disc 123 as shown in its dot-dash line position in FIG. 8 identified at 125b. At this point the stop 133 will abut against the stop member 132 so that there will be no force against the actuator 125.

In this position the rod 119 will be fully extended to a position below and in the path of the plate 115 of the sensing device 114. Also, the pin 110 will still be positioned between the actuator 125 and the finger 137.

As the lowering table continues to move upwardly, the rod 119 will eventually come against the lower edge of the plate 115 and move it upwardly so that the sensing device will then be in the path of movement of the cross member 45 of the infeed pusher 8.

When the next package is pushed onto the lowering table from the platform 27 by the infeed pusher 8, it causes the outfeed pusher 97 to recede carrying with it the pin 110. During the initial part of this movement, pin 110 will bear against the inner edge of finger 137 causing actuator 125 to move toward the left to the full line position thereof shown in FIG. 8, whereupon pressure against the bumper disc 123 will cause the rod 119 to retract and allow the sensing device to drop downwardly out of the path of the cross member 45 of the infeed pusher 8. At this point the pin 110 will clear the finger 137 and continue to be retracted as far as may be necessary, depending upon the length of the package being fed onto the table.

The finger 137 is spring biased and is provided with a cam surface 138 merely as a safety feature so that if the actuator 125 should become moved inadvertently toward the right from the solid line position thereof in FIG. 8 without the pin 110 being in its proper location with respect thereto, the pin can be moved manually toward the actuator so that the finger 137 is retracted and allow the pin to again contact the actuator 125.

Automatic determination of web length

Another important feature of the present invention concerns the automatic regulation or determination of the proper length of wrapping material web for various sized packages. The selection of a proper width of web material for different widths of packages may be simply achieved by providing a roll of wrapping material having a predetermined width. Even packages of the same width, however, may very often have different lengths necessitating a variation in the length of web necessary to completely enclose the package.

A feature of the machine of the present invention involves the automatic determination of the length of web, depending upon the length of the package being fed by the infeed pusher onto the lowering table. In general it may be noted that as the package to be wrapped is moved onto the lowering table, it carries with it the leading end of the web and causes the outfeed pusher to recede along the table. A folder bar is caused to move downwardly past the front of the table and down to a gripper bar carrying with it the web of material. The position of the gripper bar will vary depending upon the length of the package, i.e., the longer the package, the greater the distance downwardly will the gripper bar be moved. Thus, when the folder bar moves the web downwardly to the gripper bar, the lower the bar is positioned, the greater will be the length of web which will be cut and wrapped around the bottom of the package.

Referring now particularly to FIGS. 8, 9, 11, 17–22, and 29, the gripper bar which extends across the front of the lowering table 69 is identified by the numeral 147. This bar is provided at each end thereof with rearwardly extending arms 148 pivoted to rotate about the rod 149 positioned at the rear of the table. Intermediate the ends of each arm 148 there is located a cam follower 150.

At each side of the table a cylinder cam 151 is mounted on a vertical rod 152 suitably mounted on the lowering table for rotation. Rotation of the rods 152 will cause a corresponding rotation of the cams 151, thereby causing the arms 148 and gripper bar 147 to be raised or lowered.

FIGS. 8 and 9 show this particular arrangement more clearly and the sloping surface of the cam 151 may be seen in FIG. 9. When the cams 151 have been rotated to the point where the cam followers 150 rest upon the high points thereof, the gripper bar will be in the uppermost position. At this time the outfeed pusher will be positioned at the front of the lowering table after it has pushed the package onto the receiving table, and likewise when the table is in its uppermost position ready to receive another package. FIGS. 8 and 9 show the pusher 97 retracted in the position it would assume when a package has been pushed onto the lowering table and it will be noted in FIG. 9 that the cam follower 150 is intermediate the low and high points of the cam 151.

Rotation of the rod 152 is caused by the crossbars 153 and 154. One end of each of these crossbars is secured to one of the rods 152. Cross bar 153 is provided with an elongated slot 155, while the bar 154 has a similar elongated slot 156. As shown in FIG. 8, these bars 153 and 154 intersect and cross each other. A pin or bolt 157 extends upwardly through the slots 155 and 156 and into the carriage 104 (see also FIGS. 14 and 15) whereby reciprocation of the pin or bolt 157 with the carriage 104 and pusher 97 along the surface of the lowering table will cause the cross bars 153 and 154 to have a scissors-like motion and will rotate the rods 152.

Viewing FIG. 8 for example, when the pusher 97 is at the front of the table before receiving a package, each cam follower 150 will be resting on the high part of the respective cam 151. As a package is fed onto the table from the infeed pusher 8, the outfeed pusher 97 will recede toward the left in FIG. 8 causing a clockwise rotation of cross bar 153 and its cam 151, and a counterclockwise rotation of cross bar 154 and its associated cam 151.

This will result in a downward movement of each cam follower 150 and the arms 148 together with the gripper bar 147. Thus, the longer the package, the greater will be the receding movement of pusher 97 and the greater will be the downward movement of the gripper bar 147.

The folder bar, which is normally positioned above the lowering table 69 and extends transversely thereof, is indicated by the numeral 158. This folder bar 158 is mounted at each end thereof on the rearwardly extending arms 159 at each side of the table. The arms 159 are mounted to rotate about the pivot 149 and each has integral therewith a downwardly extending arm 160 whereby the arms 159 and 160 form a bell crank lever arrangement.

The lower end of each arm 160 is provided at its lower end with a roller 161 adapted to be received in a guide slot 162 (see FIGS. 11 and 17–19) associated with an actuating arm 163 at each side of the machine frame. Each of these latter arms is pivoted for rocking movement about its lower end, as shown at 164, on a part of the machine frame.

Rocking movement of the actuating arms 163 may be more clearly understood by reference to FIGS. 11 and 29 wherein it will be noted that they are connected by a cross member 165 so that they will rock in unison. Intermediate the ends of the cross bar 165 there is secured a link 166 which is connected at its other end, as at 167, to the upper end of a rocker member 168 provided with a cam follower 169 and which rocks about its lower end pivoted at 168a. This follower is urged into contact with the edge of cam 170 by means of springs 171 each connected between an actuating arm 163 and a suitable point on the machine frame, as shown in FIG. 11.

As the cam 170 rotates in a clockwise direction, as viewed in FIGS. 11 and 29, the actuating arms 163 will be caused to rock back and forth. In the position of the parts shown in FIG. 11 where the table 69 is in its uppermost position, the actuating arm 163 has been moved forwardly toward the right as far as it will go and the arm 160 will likewise be in its extreme position toward the right. This will cause the folder bar 158 to be in its elevated position. As the cam follower 169 reaches the low point on cam 170, the spring 171 will pull the actuator arm 163 toward the left carrying with it the arm 160 and lowering the folder bar 158.

This latter position of the parts is likewise shown in FIG. 17 where a package P is already in place on the lowering table 69 with the web of material W covering a part of the package bottom and then extending upwardly over the leading edge of the package below the folder bar 158 and around the roller 68 back to the main roll of material. At this point the outfeed pusher 97 will have receded the desired amount to accommodate the package, thereby rotating the cross arms 153 and 154 and the associated cam surfaces to lower the gripper bar 147 to the proper location for determining the correct length of material to be cut for the particular package.

In FIG. 18 the actuator arms 163 is shown as it has been moved toward the left, thereby rocking the arm 160 and the roller 161 also toward the left causing the folder bar 158 to fold the web of material downwardly and to grip it against the gripper bar 147.

These various parts are so arranged that the spring 171 will pull the actuator arm 163 as far as is necessary to drop the folder bar 158 downwardly to the lowest position which the gripper bar 147 may assume. The cam 170 is so contoured that the cam follower 169 will not be in contact with it even when the actuating arm 163 has been retracted as far as it will go because its movement will be limited by the position of the gripper bar 147. This design will overcome any possible difficulty which might otherwise be encountered due to any inability of the actuating arm 163 to move far enough to allow the folder bar 158 to move downwardly into contact with the gripper bar 147.

Continued downward movement of the lowering table 69 will carry with it the gripper bar 147 and the folder bar 158 which always remain the same distance from the front edge of the lowering table during movement thereof. This, then, will determine the amount of wrapping material which is properly suitable to completely wrap a package of a given length. The longer package will cause the outfeed pusher 97 to be retracted a greater distance, thus moving the gripper bar 147 downwardly a greater distance so that the distance between the edge of the lowering table and the gripper bar will be greater.

The cutting operation

The cutting knife 75 has been referred to above as preferably having a serrated edge and as being mounted on the bar 73 which has the holes 74 therein, by means of which the leading end of the web is held against movement by vacuum. The actual cutting of the web takes place by downward movement of the lowering table as will presently appear.

A wedge member or blade 172, preferably formed of a relatively flexible material, is mounted transversely of the lowering table on a crossbar 173 mounted at its ends on the rearwardly extending side arms 174. These arms are pivotally mounted on the machine frame to pivot about a point 174a (see FIG. 3) in substantal alignment with the rod 149 and having extending downwardly therefrom the arms 175 thereby forming a bell crank lever. A rocking movement of the arms 175 will cause a raising and lowering of the arms 174 and the wedge blade 172 associated therewith.

Each arm 174 is provided with an adjustable bumper 176 so that when the arm is lowered, its associated bumper will come to rest on top of the lowering table 69 as shown for example in FIG. 18.

Each actuating arm 163 is provided with an extension 177 at its upper end against which a roller 178 fixed to the lower end of an arm 175 is adapted to bear. As may be seen in FIGS. 17 and 18 for example, when the actuator arms 163 are in their extreme right-hand position as viewed in these figures, the arms 175 will have been moved toward the right, thereby to elevate the cross-bar 173 and the wedge blade 172 mounted thereon. When the actuator arms 163 are caused to move toward the left, by the co-action between the spring 171 and cam 170, they are moved away from the arms 175 thereby permitting the arms 174 and wedge blade 172 to drop downwardly until the bumpers 176 come to rest on the lowering table 69.

This blade 172 and its supporting arms 174 also move downwardly with the lowering table and about their pivots 174a until the blade 172 is received within the space between the knife 75 and the bar 73 on which it is mounted. In moving to this position, the gripper bar 147 and folder bar 158 will have moved downwardly below the knife edge, as shown in FIG. 19, whereupon the wedge blade 172 will form a bight in the web of wrapping material to fold it over and wedge it behind the cutting knife. Continued downward movement of these various parts causes the web of wrapping material to be cut by tearing it along the bight formed over the knife edge.

Another important feature of the machine is the provision of suitable brake means to stop the rotation of the cams 151 and hold them against movement after the gripper bar and outfeed pusher have reached their respective proper positions. If this sort of control is not exercised, the weight of the gripper bar 147 as it moves downwardly may cause a continued rotation of the cams 151 which will cause the bar to lower still farther to produce a greater length of film than is necessary. Furthermore, such continued rotation of the cams would cause the outfeed pusher to recede farther and cause it to become separated from the package itself. Such a brake means also obviates any difficulty which could be encountered due to varying inertias caused by packages of various sizes and weights, when the speed at which the outfeed pusher 97 recedes is so great that the inertia due to a heavy package would tend to keep it moving beyond the desired point. The brake means herein eliminates the inertia effect and permits the machine to operate at such high speed regardless of the package weight.

In the specific embodiment disclosed herein, an electric brake is provided in association with each of the vertical rods 152 to grip the rod and hold it against movement at a preselected time. Electric brakes as such are well known and are items which can be purchased on the open market and, therefore, need not be discussed in detail here.

It is sufficient as far as the invention is concerned to note that on the drive shaft 24 a brake cam 179 is provided to actuate a switch 180 at the proper time to grip the rods 152 and hold them against rotation. This is a simple electrical connection and the switch 180 is actuated to apply the electric brakes once during each revolution of the drive shaft and cam 179. The cam is timed so that as the infeed pusher 8 reaches the extent of its movement to feed the package onto the lowering table, the switch 180 will be closed to actuate the electric brakes and prevent further rotation of the rods 152 and the cams 151 mounted thereon.

Reference has heretofore been made to the microswitch 146 mounted at the upper end of the rocker arm 139. When the lowering table reaches its lowermost position with the web measured and cut, the rocker arm 139 will be caused to move toward the right until the microswitch 146 strikes the pin 110. At this moment the microswitch 146 releases the electric brake to permit rotation of the cams 151. At that point continued movement of the rocker arm 139 through the medium of the pin 110 will move the outfeed pusher 97 to push the package off of the lowering table and onto the receiving table, as may be more apparent by viewing FIGS. 20 and 21.

The package-holding finger

A further feature of the invention involves the use of a finger which is automatically brought into operation to hold the package against inadvertent sliding movement after it has been placed on the lowering table and during the time that the web of wrapping material is being brought over the top of the package and cut. During the downward movement of the folder bar 158 it exerts a pull on the web of wrapping material and will tend to move the package off of the lowering table after the infeed pusher has been retracted along the platform. To prevent any such inadvertent sliding movement of the package, there is provided a holding finger 181 which may be seen in FIGS. 8, 9 and 17-19. This finger extends downwardly through a suitable opening at the forward edge of the lowering table and is mounted at its lower end on a bar generally indicated at 182 and preferably has a shape like that shown in FIG. 8.

The finger is automatically actuated to move upwardly and be positioned immediately behind the package P after it has been pushed onto the lowering table. The specific form of the actuating device is clearly illustrated in FIGS. 8 and 9 where it will be seen that the bar 182 has an end portion 183 extending along substantially parallel to the edge of the table. The bar is then bent angularly, as at 184, and then proceeds longitudinally of the table as at 185.

The fixed bearing member 135 is provided with a pivot pin 186 to which the portion 185 of the bar 182 is pivotally mounted. The portion 185 of the bar then extends past the pivot point 186 and has a slot 187 therein to receive a pin 188 fixed to the actuator bar 189 pivoted at 190. An actuator rod 191 is secured adjacent one end of bar 189 and extends downwardly at an angle.

A cross member 192 extends between the lower ends of the arms 160 which arise and lower the folder bar 158 as heretofore explained. When the arms 160 are in the position shown in FIG. 9 where the folder bar is in its uppermost position, the cross member 192 will be in contact with the actuator rod 191 and will have moved it toward the right about its pivot 190. This will cause an elevation of the end of the actuator bar 189 which will thereupon lower the forward end of the bar 182 to lower the holding finger 181 to a position below the top of the lowering table, as shown in FIG. 9. A spring 193 is secured at its upper end to the pin 188 and at its lower end to a stud 194 mounted on the apron 77 of the table. This spring normally urges the actuator bar 189 and the inner end of the portion 185 of the bar 182 downwardly to position the finger 181 upwardly into the dotted line position thereof shown in FIG. 9. The pressure of the cross member 192 against the rod 191, however, will lower the finger against the tension of such spring.

Thus, when the table is at its uppermost position with the folder bar 158 also elevated, the finger 181 will be lowered out of the path of an incoming package. After the package has been placed on the table and the infeed pusher begins retracting, the folder bar will immediately begin to drop downwardly, thereby moving the cross member 192 away from the actuator rod 191 allowing the spring 193 to exert a downward pull and elevate the finger 181 to position it immediately behind the package.

As explained above, the table then moves downwardly with its associated parts and in cooperation with the brake-held outfeed pusher, locks the package against movement while the measuring and cutting of the web is performed. As the table approaches its lowermost position, the portion 185 of the bar 182 extending rearwardly from the pivot 186 will encounter the end of an upstanding rod 195 which will thereupon cause such end of the finger bar to be elevated and the finger to be lowered thereby clearing the way for the outfeed pusher to push the package onto the receiving table. After the package has been pushed off of the table and the table begins to move upwardly, the folder bar will be elevated by operation of the arms 160, whereupon the cross member 192 will move against the actuator rod 191 and cause the finger 181 to again move to its lowermost position and make way for the next succeeding package.

The recess 98 in the face of the outfeed pusher 97 heretofore referred to is to accommodate the reciprocating movement thereof during the short period of time that the finger 181 is in its elevated position.

The tuckers and folders

When the package P is pushed from the platform 27 onto the lowering table 69, the web of wrapping material will extend along a portion of the package bottom and up over the leading edge of the package. There will also be ends of the wrapping material extending outwardly beyond the ends of the package. Provision is made for tucking the web along each end of the package as it is moved onto the table and for folding downwardly those ends as the folder bar 158 folds the material downwardly over the trailing edge of the package.

Referring particularly to FIGS. 4, 8 and 11, as well as to the schematic showings in FIGS. 17-22, it will be seen that a pair of spaced tucker members 196 is located on the table 69 which are mounted on rearwardly extending arms 197. Each arm 197 is provided at its rear end with a bearing member 198 allowing it to slide along the rod 149. As the package is pushed onto the table 69, these tucker members 196 tuck the wrapping material along each end of the package.

There is also provided a pair of downfolder arms 199 positioned immediately above the tuckers 196, as shown in FIG. 4, and which are normally in an elevated position as shown in FIG. 11. These downfolder arms 199 are also mounted for sliding movement along the rod 149 together with the bearing members 198 of the tuckers 196.

Each downfolder arm 199 has extending downwardly from the rear end thereof, an arm 200 which, together with the arm 199, forms a bell crank lever which is rotatable about the rod 149 as well as slidable along the length thereof.

The lower ends of each arm 200 normally bear against the cross rod 165 which extends between the rocker arms 163. The weight of the downfolders 199 tends to make such bell crank want to rotate in a clockwise direction about the rod 149 and thus will hold the arm 200 against the crossbar 165.

As the package is received onto the lowering table 69 and reaches its proper position thereon and after the infeed pusher 8 has been retracted along the platform 27, the rocker arms 163 will move rearwardly, as explained hereinabove, and will thus not only cause the folder bar 158 to move downwardly, but will also allow the downfolder arms 199 to move downwardly, which will thereupon cause the wrapping material which extends beyond each end of the package, to be folded downwardly onto the top of the lowering table.

As may be seen from viewing FIGS. 17–22, the web is folded across the top of the package by the folder bar 158 which holds it against the gripper bar 147. The downfolders 199 will also fold the ends of the material along the ends of the package, and the lowering table will then move downwardly carrying these various parts with it. FIG. 19 shows the wedge blade 172 behind the cutting blade 75 which thereupon forms a bight of the wrapping material thereover. In FIG. 19 the continued movement of the table downwardly has caused the wrapping material to be pulled across the serrated edge of the cutting blade and thereby severed from the remainder of the web.

This condition of the wrapping material then prevails during continued downward movement of the table and package, as in FIG. 20, and until it reaches the lowermost position so that the outfeed pusher 97 may push the package off of the table and onto the receiving table. The receiving table is designated generally by the numeral 201 and consists of two elongated spaced rails 202 and 203 (see FIGS. 23 and 24). During the movement of the package onto this receiving table 201, the web W of wrapping material is folded upwardly along the bottom of the package into overlapping relation with the initial fold along the package bottom which previously occurred during the movement of the package onto the lowering table.

Also during movement of the package onto the receiving table 201, the front portions of the material extending beyond the ends of the package will be tucked along the ends thereof by the tuckers 204 positioned at each side of the center of the machine, as may be seen more clearly in FIG. 23.

Each tucker is mounted on a downfolder support 205, one located at each side of the machine center and each of which is mounted at the upper end of a supporting plate 206. Initially when the package is moved onto the receiving table 201, the downfolder supports 205 are in a lowered position at the same level as, or slightly below, the receiving table rails 202 and 203. At this point the web will have been wrapped beneath the package and the ends thereof tucked along the ends of the package by the tuckers 204. The downfold supports 205 are then caused to move upwardly above the rails 202 and 203 to perform a partial downfolding of the extending ends of the web of wrapping material.

The package is then caused to move by means of an outfeed conveyor onto the belt conveyor 276 where the sealing of the package takes place. As the package is thus moved, the extending ends of the wrapping material which have been partially folded downwardly, will be located outwardly of the tuckers 204 and downfolding supports 205, and inwardly of the underfolding plows 207. Each such plow comprises an elongated L-shaped member consisting of a vertical leg 208 and a horizontal leg 209. Each of the horizontal legs 209 which extend toward each other, as shown in FIG. 23, have their edges inclined and converge toward each other from the end thereof, which initially receives the package, toward the end at which the package is conveyed onto the conveyor 276. Thus it will be evident that as the package moves along the length of the downfolder supports 205 and the plows 207, the ends of the wrapping material positioned therebetween as shown in FIG. 24 will be caused to be folded under the package so that the underfolding step will have been completed by the time the package reaches the conveyor 276 where it is sealed.

The plates 206 on which the supports 205 are mounted are maintained to move in a vertical path by means of a secondary parallelogram comprising the rods 206a and 206b mounted at one end to the plate 206 and at their other ends on the frame (FIGS. 20–24).

The downfolder supports 205 are elevated and the package conveyed away therefrom to the sealing means by mechanism which may be more clearly understood by viewing FIGS. 3, 11, 17–23, and 29. In these figures it will be noted that a shaft 210 extends between suitable bearing members 211 on the spaced upper bars 79 of the parallelogram which operates the raising and lowering of the table 69. A sprocket 212 is mounted on the shaft 210 for rotation and supports a chain 213 which constitutes the outfeed conveyor. This chain also passes around another sprocket 214 mounted on the shaft 57 heretofore described. As the table 69 is moved between its lower and upper positions carrying with it the shaft 210, it will likewise carry one end of the outfeed conveyor, which is mounted thereon, through the sprocket 212.

A rod 215 also extends between the upper bars 79 of the parallelogram and moves upwardly and downwardly therewith. Each of the plates 206 has associated therewith a bumper 216 which may be seen in FIGS. 11 and 20–22. As the bars 79 move to their uppermost position, they will carry the rod 215 therewith and eventually come against the bumpers 216 on the plates 206, thereupon elevating the plates and the downfolder supports 205 mounted thereon. This upper position of the table, the bars 79, and outfeed conveyor 214 may be seen in FIGS. 17, 22 and 29. In this position the upper reach of the outfeed conveyor chain 213 is in a substantially horizontal position. The chain is moved by rotation of shaft 57 on which the sprocket 214 is mounted. This chain has a lug 217 thereon which is so positioned that upon the table reaching its uppermost position, it will come against what now has become the rear edge of the package and move it along the plows 209 and onto the conveyor 276.

Thus, at this point the package has had the front and rear tucks placed therein and the downfold, as well as the underfold performed thereon, so that the wrapping material is ready to be sealed. The sealing step and the construction of the sealing and shrinking means will be described hereinafter.

It may be noted here that the machine is also provided with suitable mechanism for adjusting certain parts of the machine to accommodate packages of different widths. This is a common feature in wrapping machines and such adjustment forms no part of the present invention. Describing this mechanism briefly, however, it will be noted that the rear tuckers 196, the downfolders 199, the downfolder supports 205, and the plow members 207, must all be adjusted toward or away from each other to accommodate different width packages. In FIGS. 4 and 8 it will be noted that the tuckers 196 and downfolders 199 are provided for movement together along the rod 149 and are caused to do so by being attached to a pair of plates 218 which have mounted thereon rollers 219 received in the channel members 220. These are in turn mounted on a threaded rod adjacent the rear of the machine which extends transversely thereof and which is indicated in FIG. 3 by the numeral 221. The threads outwardly from the center of this rod are disposed in opposite directions on each side so that rotation thereof in one direction or the other will cause the tuckers and downfolders to move toward or away from each other.

A similar threaded rod 222 extends transversely of the machine adjacent the forward end thereof on which the other adjustable members are mounted. A chain 223 is trained around suitable sprockets on shafts 221 and 222 so that when the shaft 222 is rotated by means of the hand wheel 224, both of the threaded rods will be rotated to adjust the various parts to accommodate packages of various widths.

Wrapping material feed

A further important feature of the invention is the novel arrangement for storing a plurality of rolls of wrapping material and the feeding of the material through the machine during the package wrapping operation only when such feeding is required to maintain a proper length thereof available at all times. In describing these features reference will be made primarily to FIGS. 3, 4, 11, 12, 17–19, and 29.

Referring now especially to FIGS. 3, 4 and 11, it will be noted that at one end of the machine there is provided a pair of vertically extending side supporting plates 226 and 227 which support the ends of a plurality of support rods, drive shafts, and idler shafts. In the specific form of the invention shown there is provided a pair of upper rods 228, a pair of intermediate rods 229, and a pair of lower rods 230. If desired, of course, there may be a greater or lesser number of such pairs of supporting rods depending upon the number of rolls of wrapping material it is desired to store in this area.

As shown, there are three rolls of wrapping material indicated by the numerals 231, 232 and 233. The upper roll 231 is shown at rest on the supporting rods 228. The lower roll 233 is shown resting on the supporting rods 230. These latter two rolls are shown in their storage positions while not in use. The roll 232 will be supported on the rods 229 when it is not being used. Each roll is intended to have a different width of wrapping material thereon so that when a package of a predetermined width is to be wrapped, that will determine which of the rolls of wrapping material is to be used.

There is also provided an upper drive shaft 234 in association with an idler shaft 235. Therebelow there is an intermediate drive shaft 236 associated with an idler shaft 237 and near the bottom a third drive shaft 238 is provided in association with an idler shaft 239.

The arrangement is such that any roll which is not being used will rest upon its pair of support rods. When a particular roll of a predetermined width is to be brought into use, it is merely moved onto the particular drive shaft and idler shaft adjacent the support rods so that the roll does not have to be lifted. Many times women operate the machines disclosed herein and this is of particular advantage in such instances where the roll of wrapping material does not have to be lifted into its operative position.

As will appear hereinafter, the drive shafts 234, 236 and 238 are driven from the main drive shaft 24. They are not driven constantly, however, but are caused to rotate to feed wrapping material when called upon to do so by action of an electric clutch and a microswitch when the length of wrapping material available for a package to be wrapped reaches a predetermined minimum.

In this connection the lower drive shaft 238 is provided at one end thereof with a pulley 240 (see FIG. 29). The intermediate drive shaft 236 also has a pulley 241 at one end thereof and a belt 242 passes around these pulleys so that when one shaft rotates, the other will also rotate at the same rate of speed. A second pulley 243 is also mounted on the intermediate shaft 236 and is connected by means of a belt 244 with a pulley 245 on the end of the upper drive shaft 236. It is immaterial as to which of the shafts is driven by the main drive shaft, but in this particular instance for purposes of illustration, the intermediate shaft 236 is the one which is driven by the main drive shaft, and through the belt connections 242 and 244, the upper and lower drive shafts 234 and 238 are also caused to rotate. To accomplish this result, the shaft 236 is provided with a pulley 246. A stub shaft 247 is located below the shaft 236 which has mounted thereon a pulley 248. The pulleys 246 and 248 are connected by a belt 249 so that rotation of the stub shaft 247 will rotate the drive shaft 236 and the other two shafts connected thereto through the belt and pulley arrangement just described.

The stub shaft 247 has a sprocket 250 mounted thereon and is driven by a sprocket 251 on shaft 252 by means of a chain 253 passing around both sprockets 250 and 251. An elongated shaft 252a mounted in suitable bearings and in alignment with the shaft 252 is driven constantly by the main drive shaft 24. This is accomplished through a pulley 254 on the end of shaft 252a which is connected to another pulley 255 on the drive shaft 24 by means of a belt 256. An electric clutch 257 is operated at appropriate times by the closing of an electrical circuit thereto to engage the shafts 252 and 252a, whereupon the shaft 252 will be coupled to shaft 252a and driven by the main drive shaft. This is in turn will cause rotation of all of the drive shafts 234, 236 and 238 as heretofore described.

A second pulley 258 is fixed to the shaft 234 and is connected to the uppermost drive shaft 259 through a belt connection 260 which passes around a pulley 261 on said shaft 259 (see FIG. 12). Immediately above the shaft 259 there is an idler shaft 262 provided with a plurality of spaced apart ring members 263 which are normally in contact with the peripihery of shaft 259. When this latter shaft is caused to rotate through the various belt connections just described, it will also rotate shaft 262 by reason of the rings 263 mounted thereon. As will presently be seen, the web of wrapping material is fed between the shafts 259 and 262 by means of the frictional engagement between the rings 263 and the surface of shaft 259.

The ends of shaft 262 are received in slots 264 located in plate members 265 at each side of the machine frame. The upper end of each slot 264 has an offset portion 266 so that the shaft 262 may be elevated out of contact with shaft 259 and positioned in the offset part 266 of the slot so that it may rest there and allow the operator of the machine to feed wrapping material from a roll around shaft 259 and between it and shaft 262.

A plurality of belts 267 extend around grooves in shaft 259 and around similar grooves in the surface of shaft 268 (FIGS. 4, 11 and 12).

When a roll of wrapping material of the desired width is moved into place so that it is cradled by one of the drive shafts, such as 236 and its associated idler shaft 237, the material is initially unwound therefrom and extends upwardly around shaft 259 and along the belts 267 and then downwardly around the shaft 268. A tension bar 269 is provided which has the ends thereof received in vertical slots 270 provided in vertically extending guide bars 271 at opposite sides of the machine behind the lowering table and in front of the shaft 268 and the rolls of wrapping material. The tension rod 269 is able to traverse the length of the slots 270 when required to do so as the wrapping material is used.

When the web is being threaded through the machine, however, the tension rod 269 is manually elevated and allowed to rest in the offset portion 272 of the slot 270 at the upper end thereof. Thus, the wrapping material may be brought around the shaft 268 and a loop formed therein below the tension rod 269. This operation is preferably performed while the machine is running so that the shaft 236 on which the roll of material is cradled, will be rotating to facilitate the unwrapping of the material therefrom. The belts 267 will also be operating and the material also fed between the drive shaft 259 and the idler shaft 262 resting thereon. After the loop has been formed in the web of wrapping material below the tension rod 269, it may be removed manually from its resting place in the offset 272 and allowed to slide downwardly in its guide slots and contact the upper surface of the web. The operator simultaneously will thread the web over the roller 273 and pull it forwardly around the roller 68 heretofore described and down to the holding means for the leading end thereof, which in this case comprises the vacuum bar 73.

Two microswitches are provided on one of the guide bars 271, the upper one being indicated at 274 and the lower one by the numeral 275.

As the machine operates to wrap packages and the web is pulled downwardly over the roller 68 by the folder bar and gripper bar and lowering of the table, the drive shaft 234, 236 and 238 will not be operating and the electric clutch 257 will be disengaged. This causes the tension bar 269 to move upwardly in its guide slots until eventually it will close the upper microswitch 274. This, then, actuates the electric clutch 257 to couple shafts 252 and 252a together, thereupon causing rotation of the wrapping material drive shafts. In the illustration of FIG. 11 the roll being used is cradled between the drive shaft 236 and its idler shaft 237 so that when the electric clutch is engaged, shaft 236 will rotate in a counterclockwise direction, thereby causing the roll of wrapping material 232 to rotate in a clockwise direction and unwind the web of material.

The material will unwind faster than it is being used so that the tension bar 269 will begin to drop downwardly in its guide slots until it passes the normaly closed lower microswitch 275 to open the switch and the circuit to the electric clutch which thereupon disengages the two shafts and stops further unwinding of the wrapping material roll.

It may here be noted that the electrical circuits of the machine are such that when the machine is first started by pressing the start button, all the drive shafts 234, 236 and 238 will begin rotation and will continue until the microswitch 275 is opened to stop further feeding.

From the foregoing it will be apparent that a novel ararngement has been provided for storing rolls of material which are not currently being used and a novel web feed arrangement has also been provided. If a small package is being wrapped, it may require several wrappings before the tension bar 269 will be pulled upwardly by the shortening of the web length to the microswitch 274. When the tension bar reaches the upper switch, that will be the minimum length of web desired between the vacuum holding bar 73 and the roll from which the material is being unwound. When the tension bar 269 reaches its uppermost position, that position will determine the maximum length of web desired between the vacuum holder 73 and the roll of material. Thus, these predetermined minimums and maximums will assure adequate wrapping material at all times for the packages being wrapped.

Heat sealer and shrinker

As mentioned hereinbefore, the material usually used to wrap packages in the machine to which the invention herein is to be applied, is heat sealable. A more recent improvement in heat sealable wrapping material is the capability of the material to be shrunk about the package by the application of heat thereto. It is thus a further feature of the invention herein to provide novel heat sealing means to seal the underfolded ends of the wrapping material against the bottom of the package. Another feature which complements the heat sealing means is the provision of a heat tunnel or shrink tunnel through which the package may pass after the underfolded ends have been sealed, whereby the wrapping material may be shrunk about the package.

The heat sealer for the bottom of the package will first be described and in this connection reference will be made generally to FIGS. 3, 4, 11, 22, and 25–29. FIGS. 25–28 show the details, while the other figures mentioned illustrate the heat sealer in its association with other parts of the machine in general.

Reference has heretofore been made to the belt conveyor 276 which receives the package from the outfeed conveyor 213. This belt conveyor 276 has a plurality of spaced transversely extending pusher bars 277 throughout the length thereof secured to the belt and mounted at their ends onto the endless chains 278 and 279. These latter chains extend around sprockets on the ends of the two shafts 280 and 281. The shaft 280 is positioned adjacent the outfeed conveyor 213 and the other shaft 281 is located at the exit end of the heat tunnel 3 (FIG. 11). Thus, the conveyor carries the package over the heat sealer for the underfolded ends and through the heat tunnel if the wrapping material happens to be of a heat shrinkable character.

The belt conveyor 276 preferably has an intermittent movement. This is an important consideration particularly when a heat shrinkable material is used. The package when wrapped in such material must necessarily be subjected to a predetermined temperature for a predetermined time. The shorter the time, the higher the temperature must be, but high temperatures may tend to burn the material or discolor meat in the package. If the belt conveyor 276 were to be moved continuously, then the tunnel 3 would have to be comparatively long in order for the package to remain therein at a required low temperature for the required time. By moving the conveyor and package intermittently, the period of time that it is at rest within the tunnel is sufficient to cause the shrinking action at a low temperature and thus the tunnel can be considerably shortened.

The conveyor 276 is also driven from the main drive shaft 24, as may be seen from FIG. 29. A sprocket 282 on one end of shaft 280 is driven by a chain 283 which passes around another sprocket 284 on a shaft 285. This shaft is provided with a gear 286 in mesh with another gear 287 on a shaft 288. This latter shaft has mounted thereon a Geneva drive disc 289, the radial slots of which are adapted to receive suitable studs 290 on a sprocket 291. This latter sprocket is driven by the chain 292 from the sprocket 293 mounted on the main drive shaft 24.

The belt 276 is preferably formed of a thin flexible material and the upper reach thereof passes over heating elements, the details of which may be clearly seen by reference to FIGS. 25–28. A pair of plates 294 and 295 are each provided with a plurality of longitudinally extending spaced upstanding ribs. These ribs on the plate 294 are indicated by the numeral 296 and those on the plate 295 are indicated by the numeral 297. Each plate 295 and 294 as positioned therebelow and in contact therewith the heating elements 298 and 299. When these heating elements are heated, they will elevate the temperature of the plates 294 and 295 and will heat the respective ribs 296 and 297.

An important feature of this aspect of the invention is the fact that the plates 294 and 295 are positioned in an inclined manner downwardly toward the center of the conyeyor so that the innermost rib on each plate is lower than the outermost rib thereon. This is important from the standpoint that when the extending ends of the wrapping material are folded underneath the package along the bottom thereof, the layers of material will be thicker near the edges of the package and thinner toward the center of the package. This is because the material tends to fold upon itself so that the extreme ends of the material on the bottom of the package may have only one or two layers, whereas the material near the edges of the package will have several layers folded on top of each other. Thus, more heat and pressure will be required to seal the package near its edges than where the underfold terminates. Thus, as shown for example in FIG. 27, the package P will have the outer edges thereof resting upon the uppermost edges of the ribs which incline downwardly therefrom so that nearer the center of the package the ribs will either not be in contact therewith, or the contact will be under relatively light pressure, as hereinafter described. Thus, heat and pressure are applied where it is needed most and the lesser heat is applied where it is needed less.

The provision of the ribs 296 and 297 also is for a definite purpose which relates to the heat shrinkable film. When heat is applied to the bottom of the package, the material will shrink in the areas of heat application. Thus, if the heat is applied uniformly across the bottom, there will be no areas which will not tend to shrink and, therefore, all of the material will shrink and may tear or break. On the other hand, with the use of the ribs, the material will shrink primarily in the areas where the ribs heat the film, thereby allowing those areas to shrink without breaking because there are intermediate areas of the unshrunk material.

Between the two plates 294 and 295 there is provided a channel member 300 having a bottom 301 and upstanding sides 302 and 303. The sides 302 and 303 have secured thereto the movable plates 304 and 305 which have a sliding movement up and down with respect to the channel 300. Each plate 304 is provided with a pin 306 which extends outwardly therefrom and rests upon a spring member 307. This wire spring 307 has one end mounted on a stud 308 and is biased upwardly at its free end against the associated pin 306, thereupon normally urging each of the plates 304 and 305 to an upper position. Pins 309 at each side limit the downward movement of the wire spring 307 and the plates 304 and 305.

This arrangement is advantageous when wrapping packages formed of paper or cardboard trays where the bottom thereof tends to have an upwardly convex configuration. If all such packages were to be flat across the bottom, no problem of sealing would be encountered. However, the upwardly curved upper edges of the plates 304 and 305 will assure that even an upwardly convex bottom will be contacted by the heat of these center plates. These plates slide up and down under pressure of the spring 307 to accommodate packages, the bottoms of which may vary as to the degree of convexity. A heating element 310 (FIG. 28) is in contact with the underside of the channel member 300 to impart heat thereto, thereby to insure a thorough sealing of the entire bottom of the wrap.

The heat or shrink tunnel which has heretofore been identified by the numeral 3 in general is provided with a top 311 and downwardly extending sides 312 and 313 supported by frame members which extend longitudinally of the machine. This structure provides an enclosure through which the intermittently moving belt conveyor 276 moves and into which a portion of the heated plates 294 and 295 extend. As mentioned hereinbefore, air is blown into the tunnel through the flexible tube 72, which air is heated by any suitable electrical heating means indicated generally in FIGS. 3 and 4 by the numeral 314. Each package as it emerges from the tunnel passes over rollers 315 and onto the weighing scale.

As the wrapped package moves across the heat sealer, a yieldable pressure is applied thereto near the ends of the package. This is accomplished in the present machine by the use of a plurality of spring or yieldable ring members 316 (FIGS. 4, 11 and 22) at each side of the machine. There are two groups of such yieldable members each mounted on a bar 317 at each side of the machine and which also are mounted to move toward and away from each other when adjustments are being made for packages of different widths.

These bars 317 extend rearwardly and each is pivoted at its rear end, as at 318, to a vertically extending side plate member 319 mounted on a suitable part of the machine which in turn is mounted on the transverse threaded rod 222 so that such plates may be moved toward and away from each other and carry with it the yieldable member 316.

These bars 317 and the yieldable member 316 mounted thereon are caused to be elevated as a package is being moved by the outfeed conveyor 213 onto the conveyor 276 and to thereafter move downwardly into contact with the package pressing the ends thereof against the heating elements as soon as the lowering table begins its downward movement. An understanding of the manner in which this is accomplished may be acquired by viewing the detailed view thereof shown in FIG. 23a.

Each bar 317 is provided with a bearing block preferably formed of nylon or other suitable material indicated by the numeral 320 in FIGS. 11 and 22. A crossbar 321 extends transversely of the conveyor upon which the bearing blocks 320 carrying the bars 317 may rest in the upper position thereof. Each end of the crossbar 321 is provided with a downwardly extending arm 322, the lower ends of which are secured to a plate 323 mounted at the opposite end thereof on the machine frame for pivotal or rocking movement, as at 324.

The upper bar 79 of the major parallelogram is provided with a stud 325 which extends outwardly therefrom and is adapted to come against the underside of plate 323 when the bar 79 is elevated as it raises the lowering table.

Since the package is moved along the plows onto the conveyor 276 simultaneously with movement of the next package to be wrapped from the platform 27 onto the lowering table, this table, as well as the bar 79 will be in their uppermost position. At this point the stud 325 will have rocked the plate 323 so that the free end thereof to which the crossbar 321 is secured by means of the arms 322, will have been elevated. During this elevation the crossbar 321 will come against the block 320 to elevate the yieldable members 316. A coiled tension spring 326 extends between the bar 317 and the plate 319 on which it is mounted, thereby to urge the yieldable members 316 downwardly against the package. When the lowering table and all of the parts associated therewith begin their downward movement, the crossbar 321 will also move downwardly and allow the yieldable member 316 to move down onto the package, thereby pressing it against the heating elements to insure a proper seal of the ends of the wrapping material against the bottom of the package.

Operation

Figure 5:
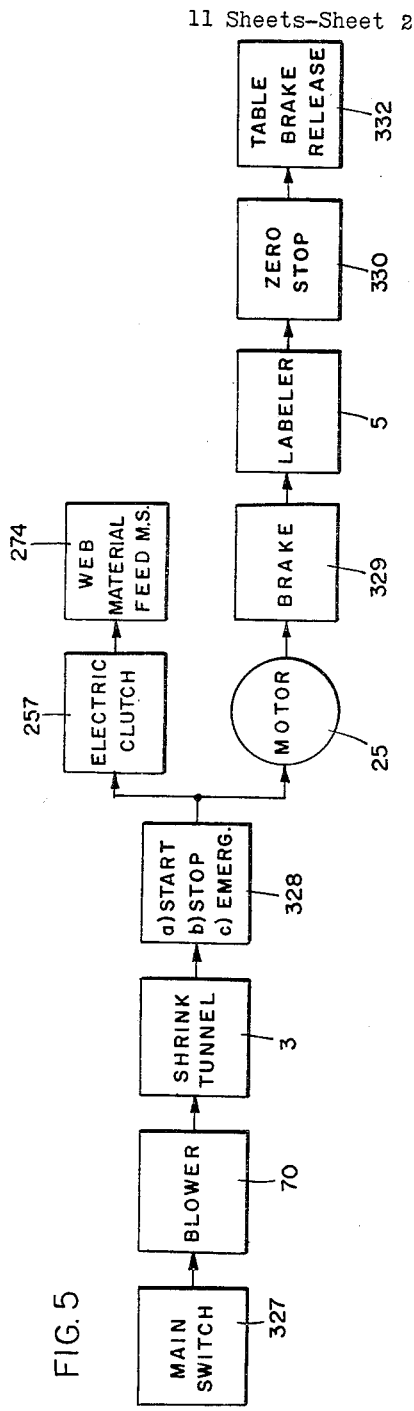
FIG. 5 is a diagrammatic layout showing the general arrangement of an electrical relation between the various elements of the wrapping machine of the present invention.

The schematic illustration of FIG. 5 shows in a general way the manner in which the various electrical parts and operating parts are associated together. Some of the parts have already been identified by numerals heretofore. In FIG. 5 the main switch may be identified by the numeral 327. This is in series with the blower 70 and the shrink tunnel 3. The panel having thereon the start and stop buttons, as well as the emergency button, is identified by the numeral 328. The electric clutch 257 and the microswitch 274 for feeding the web of wrapping material, is shown in series with the clutch 257. In parallel therewith is the main motor drive 25 and the brake referred to hereinabove but not identified by number. The brake in the diagram of FIG. 5 is identified at 329 and is the brake which is associated with the crossbars 153 and 154 and the infeed pusher 97 to hold them and the gripper bar in proper position after the package has been received on the table. The labeler 5 is also in series with these other elements and in addition thereto there is what may be termed a zero stop switch 330. The purpose of this is so that the parts of the machine will always stop in the same place after the stop button has been operated. In other words, the machine goes through a complete cycle and if the stop button is pressed at any time during the cycle, such cycle will be completed before the machine stops.

Referring to FIG. 29, the zero stop microswitch is shown at 330 and this switch is actuated by a cam 331.

The arrangement is such that the cam 331 will not come to the proper place to actuate the switch 330 and stop operation of the machine after the stop button has been pressed until the machine has completed its cycle. With the circuit thus opened by the cam 331 and the application of the stop button, the machine will stop at the end of the cycle.

Again in FIG. 5, the table brake release is identified at 332 which merely indicates that the brake 329, which has been applied by closing of the switch 180 through the cam 179, is released by the microswitch 146 on the end of rocker arm 139 when it begins the outfeed movement of pusher 97.

By way of resume, the sole operator of the machine will stand adjacent one end of the infeed conveyor 6 and will take packages one at a time, which have been theretofore placed on the shelf 11, and place them on the conveyor, the movement of which will square the package for proper placement in front of the cross-feed pusher 7. This latter pusher moves the package across the platform 27 to a position in front of the infeed pusher 8. The desired roll of wrapping material will have been moved to the operative position thereof where it is cradled between one of the drive shafts and the idler shaft associated therewith, such as 236 and 237. The web will have been properly threaded between the drive shaft 259 and idler shaft 262 across the belts 267, around the rod 268, downwardly below the tension bar 269, upwardly over the rod 273, and over and down around the roller 268, so that the leading end thereof will be held in place by the vacuum bar 73. As the infeed pusher 8 pushes the package through the web to pull it away from the vacuum holding means, and onto the lowering table 69, the leading end of the wrapping material will be positioned along a part of the package bottom upwardly over the leading edge of the package and then under the folder bar 158. This will cause the outfeed pusher 97 to recede which will rotate the two cams 151 and cause the gripper bar 147 to be lowered an amount which depends upon the length of the package. The longer the package, the farther will the gripper bar drop downwardly, thereby to provide a greater length of web.

The finger 181 will have been raised by this time so that it will cooperate with the brakes which hold the outfeed pusher 97 against movement thereby to securely lock the package in place against movement. It is understood, of course, that the other wrapping elements such as the tuckers 196 and downfolders 199 will have been adjusted properly for the width of the package so that it will be held in place and locked on all four sides.

The lowering table is then caused to move downwardly and at the same time the folder bar 138 folds the web of material over the top of the package and downwardly over the front edge of the table to a position where the material is held between the folder bar 158 and the gripper bar 147. This position is illustrated in FIG. 18 where it will be noted that the wedge blade has also been allowed to drop downwardly until the bumpers thereon come to rest on the table.

Still further downward movement results in the wedge blade 172 wedging the wrapping material over the top and behind the cutting blade 75, as in FIG. 19, whereupon the cutting blade, being stationary, will cause the web to be severed as the table continues to move downwardly.

At this point the proper length of web will have been cut for wrapping the package having the predetermined length so that when the table and its associated parts reach almost the lowermost position thereof shown in FIG. 20, the rocker arm 139 will have come against the pin 110 and the brake will be released to allow the outfeed pusher 97 to move the package off of the table. By the time the parts reach their lowermost position as shown in FIG. 21, the folder bar 158 and gripper bar 147 will have been separated a sufficient amount to allow the web to be withdrawn therefrom as the package is moved onto the receiving table 201, and permit the trailing edge of the web to be folded along the bottom of the package into overlapping relation with the leading end thereof already present.

It may be mentioned at this point that the bumpers 176, connected to the arms 174 on which the wedge blade 172 is mounted, are adjustable so that the amount of overlap of the leading and trailing ends of the wrapping material may be varied as desired.

As the package is pushed onto the receiving table 201, the opposite sides of the wrapping material are tucked along the ends of the package and the extending ends of the material beyond the package will have previously been folded partially downwardly. The remaining downfold of these extending ends of material is accomplished when the downfolder supports 205 raise the package upwardly off the receiving table 201 and the outfeed conveyor moves it along the plows 209 to the heat sealing station.

At this point the package is completely wrapped and it then is sealed along the bottom in the manner described above and the material is then caused to shrink about the package as it passages through the heat tunnel, if the wrapping material is of the heat shrinkable type.

As each package is delivered from the heat tunnel, it moves to the weighing scale 4 and is there weighed. As mentioned above, the weighing of the package causes a weight and price label to be printed and automatically applied to the proper package at the labeling station 5. Referring again for a moment to FIG. 29, the labeler is caused to be operated by means of a cam 333 mounted on the main drive shaft 24 which, at the proper time, closes the circuit to the labeler through the microswitch 334.

From the labeler the packages pass onto the shelf 9 where they may accumulate and may thereupon be removed in groups by the operator merely by pulling them off of the shelf 9 and onto the lower shelf 10. The packages may then be removed by other personnel for placement in storage or display containers.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. In a wrapping machine
    (a) a wrapping station,
    (b) an infeed pusher positioned at a predetermined height and adapted to convey a package to be wrapped from the machine operator through a web of wrapping material to said wrapping station, whereby the wrapping material extends from under the package upwardly around the advancing edge thereof,
    (c) means to move the wrapping material downwardly across the top and below the rear edge of the package at said wrapping station,
    (d) cutting means to cut the wrapping material after movement thereof to below the rear edge of the package,
    (e) means at said wrapping station to move the package to a level lower than the level of said infeed pusher, and
    (f) outfeed conveyor means positioned at a level lower than the level of said infeed pusher and adapted to convey the wrapped package from said wrapping station back to the machine operator.

2. The combination of elements defined in claim 1, including a second conveyor adjacent said outfeed conveyor and positioned at a level lower than said outfeed conveyor onto which the wrapped packages may be placed by the machine operator from said outfeed conveyor and adapted to convey the wrapped package away from the machine.

3. In a wrapping machine as defined in claim 1

(a) an infeed conveyor positioned at one side of said wrapping station and adapted to convey a package to a first position, and (b) a cross-feed pusher member adapted to convey a package from the said first position thereof to a second position in front of said infeed pusher.

4. The combination of elements defined in claim 3, wherein said infeed conveyor comprises a stationary support for the package, and a plurality of spaced pusher members extending transversely of said support and movable toward said cross-feed conveyor member, whereby the package will be automatically properly positioned for delivery to said cross-feed conveyor.

5. In a wrapping machine (a) a lowering table, (b) a platform adapted to receive a package to be wrapped, (c) infeed pusher means to move a package to be wrapped from said platform through a web of wrapping material and onto said table, said package carrying with it wrapping material to position it beneath said package and upwardly over the advancing edge thereof, (d) a folder bar normally positioned above said table, (e) a gripper bar below the level of said table, (f) means to move said folder bar downwardly to said gripper bar, carrying with it the wrapping material across the top of and behind the package and forming a bight therein between said folder bar and gripper bar, (g) cutting means for the wrapping material, (h) means for moving said lowering table with the package thereon, and said folder and gripper bars with the wrapping material therebetween, downwardly to a level below said platform, (i) means cooperating with said cutting means, and operable during downward movement of said lowering table, to sever the wrapping material, (j) and outfeed pusher means for moving said package off of said table while in the lowered position thereof thereby to fold the trailing end of the wrapping material under the bottom of the package.

6. The combination of elements defined in claim 5, wherein said cutting means includes a fixed knife edge mounted between said platform and table, and located above said table when said table is in the lower position thereof.

7. The combination of elements defined in claim 6, wherein said means cooperating with said cutting means includes a clamping blade adapted to clamp a bight of the wrapping material over said knife.

8. The combination of elements defined in claim 6, wherein said means cooperating with said cutting means includes a clamping blade movable downwardly with said table and adapted to clamp a bight of the material over said knife edge.

9. The combination of elements defined in claim 7, wherein said knife edge and clamping blade are so positioned as to be above the level of said table at the time the wrapping material is severed.

10. The combination of elements defined in claim 5, and stop means movable against the trailing edge of the package after it is positioned on said lowering table, thereby to prevent movement of the package during downward movement of said lowering table.

11. The combination of elements defined in claim 5, including an automatic sensing device to prevent movement of said infeed pusher means through the web of wrapping material in the absence of a package on said platform.

12. The combination of elements defined in claim 5, wherein said outfeed pusher means recedes along said table under pressure of the package moving onto said table from said platform, and sensing means controlled by said outfeed pusher means to prevent movement of said infeed pusher means through the web of wrapping material in the absence of a package on said platform.

13. The combination of elements defined in claim 5, wherein a receiving table is positioned adjacent said lowering table when in the lowered position thereof to receive the package therefrom, a pair of downfolders, means for raising said receiving table between said downfolders to fold the extending ends of the wrapping material downwardly against the ends of the package, and outfeed conveyor means for moving the package from said receiving table while in the upper position thereof.

14. The combination of elements defined in claim 13, wherein one end of said outfeed conveyor means is pivotally mounted on said lowering table and movable therewith.

15. The combination of elements defined in claim 13, wherein plow means and underfolder means are located adjacent said receiving table, and said outfeed conveyor means moves the package from said receiving table after the downfolding of the wrapping material ends for folding said ends under and against the package bottom.

16. In a wrapping machine having a table, a platform spaced therefrom on which to position a package to be wrapped, a roll of wrapping material providing a continuous web extending from above the platform and table to a position therebelow and transversely thereof, and means for pushing the package through the web onto said table so that the leading end portion of the web covers a portion of the package bottom and extends upwardly over the advancing edge of the package, the improvement which comprises, (a) a fixed cutting member located between said platform and table, (b) a folder bar normally positioned above said table and movable downwardly to below said table carrying with it the web of wrapping material across the top of and downwardly behind the package, (c) movable stop means to limit the downward movement of said folder bar, (d) control means operable in response to movement of the package onto said table to vary the position of said stop means in accordance with the length of the package, thereby to control the length of the web from the leading end thereof to said cutting member, (e) means to move said table, holder bar, and stop means downwardly, and (f) means to sever the web during the downward movement of said table at the controlled length thereof.

17. The combination of elements defined in claim 16, wherein said control means includes a member on said table movable by the advancing edge of the package, and a control device associated with said stop means and actuated by said member to move said stop means a predetermined distance depending upon the length of the package.

18. The combination of elements defined in claim 16, wherein said control means includes a cam device operable to raise and lower said stop means with respect to said table, and a member on said table movable by the advancing edge of the package to actuate said cam device to lower said stop means a predetermined distance depending upon the length of the package.

19. The combination of elements defined in claim 16, wherein said control means includes a rotatable cam at each side of said table, cam followers on said stop means operable to raise and lower said stop means upon rotation of said cams, and a member on said table movable by the advancing edge of the package to rotate said cams to lower said stop means a predetermined distance depending upon the length of the package.

20. The combination of elements defined in claim 19, and automatic brake means to hold said cams against rotation after positioning of the package on said table, thereby to prevent further downward movement of said stop means.

References Cited

UNITED STATES PATENTS

| | | |
|---|---|---|
| 1,593,060 | 7/1926 | Clutter. |
| 1,673,521 | 6/1928 | Maas _____ 242—75.51 |
| 2,792,677 | 5/1957 | Kilgard et al. _____ 53—210 X |
| 2,335,750 | 11/1943 | Fincke et al. _____ 53—210 X |
| 3,170,274 | 2/1965 | Roberts et al. _____ 53—226 |

THERON E. CONDON, Primary Examiner

NEIL ABRAMS, Assistant Examiner

U.S. Cl. X.R.

53—77, 210, 388, 389; 242—58, 75.5